Nov. 21, 1944.                H. H. METCALF                2,363,137
                      METHOD AND APPARATUS FOR PRINTING
                      Filed June 30, 1941      14 Sheets-Sheet 1

INVENTOR
HOWARD H. METCALF
BY Roy A. Plant
ATTORNEY

Nov. 21, 1944.　　　H. H. METCALF　　　2,363,137
METHOD AND APPARATUS FOR PRINTING
Filed June 30, 1941　　　14 Sheets-Sheet 2

INVENTOR
HOWARD H. METCALF
BY Roy A. Plant
ATTORNEY

Nov. 21, 1944.  H. H. METCALF  2,363,137
METHOD AND APPARATUS FOR PRINTING
Filed June 30, 1941  14 Sheets-Sheet 3

INVENTOR
HOWARD H. METCALF
BY Roy A. Plant
ATTORNEY

Nov. 21, 1944.    H. H. METCALF    2,363,137
METHOD AND APPARATUS FOR PRINTING
Filed June 30, 1941    14 Sheets-Sheet 5

INVENTOR
HOWARD H. METCALF
BY Roy A. Plant
ATTORNEY

Nov. 21, 1944.  H. H. METCALF  2,363,137
METHOD AND APPARATUS FOR PRINTING
Filed June 30, 1941  14 Sheets-Sheet 9

INVENTOR
HOWARD H. METCALF
BY Roy A. Plant
ATTORNEY

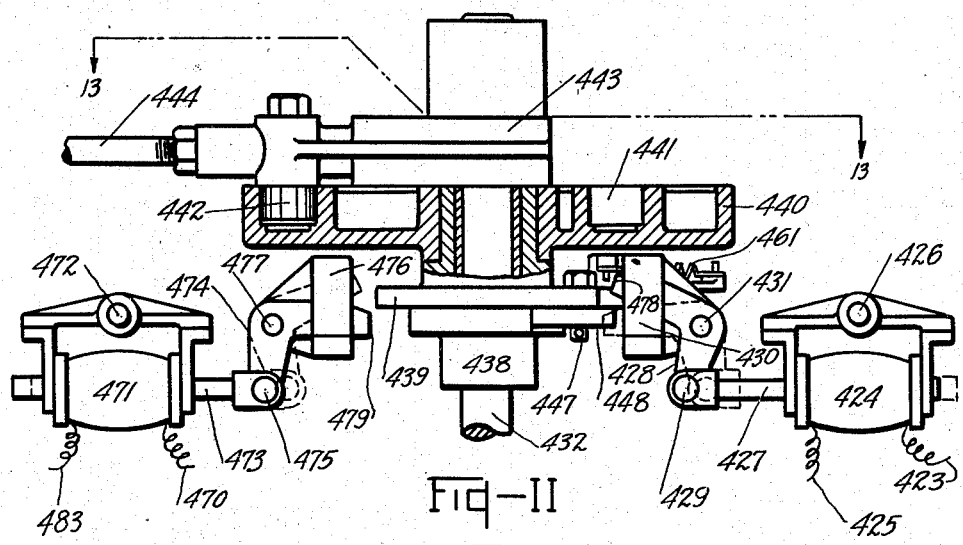
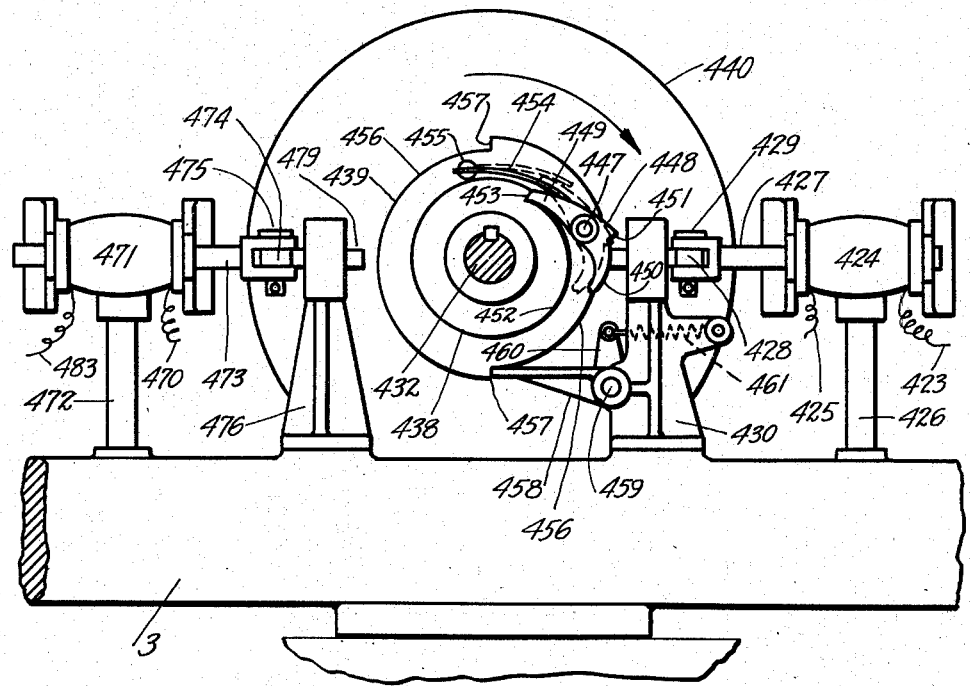

Nov. 21, 1944.    H. H. METCALF    2,363,137
METHOD AND APPARATUS FOR PRINTING
Filed June 30, 1941    14 Sheets-Sheet 11

INVENTOR
HOWARD H. METCALF
BY Roy A. Plant
ATTORNEY

Nov. 21, 1944. H. H. METCALF 2,363,137
METHOD AND APPARATUS FOR PRINTING
Filed June 30, 1941 14 Sheets-Sheet 12
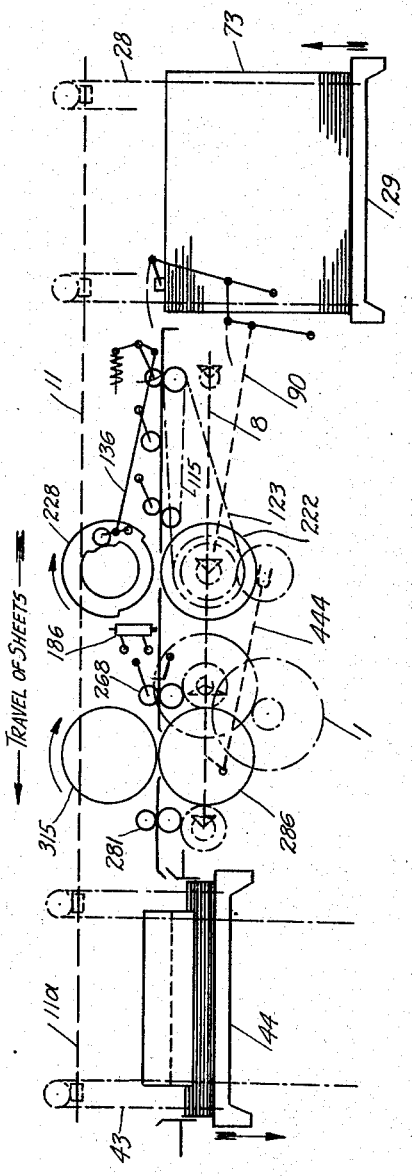
INVENTOR
HOWARD H. METCALF
BY Roy A. Plant
ATTORNEY

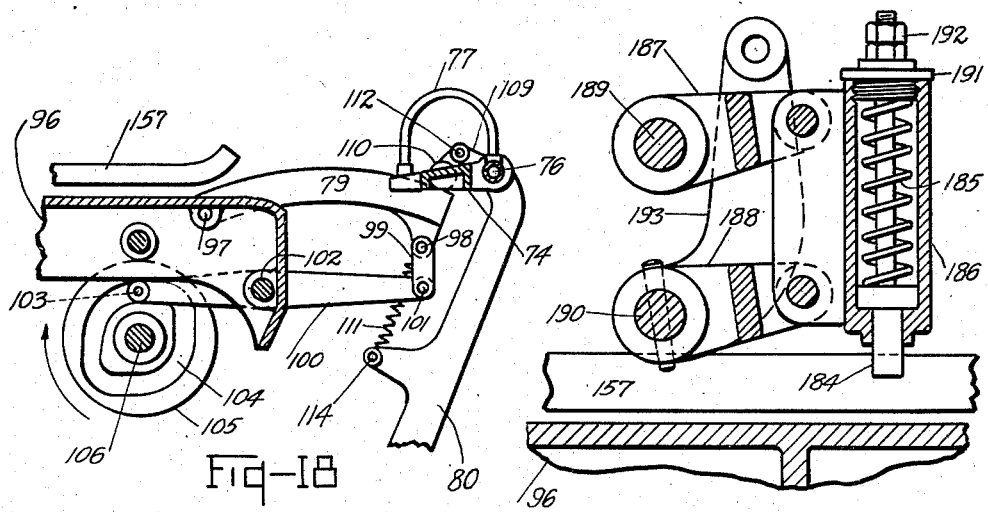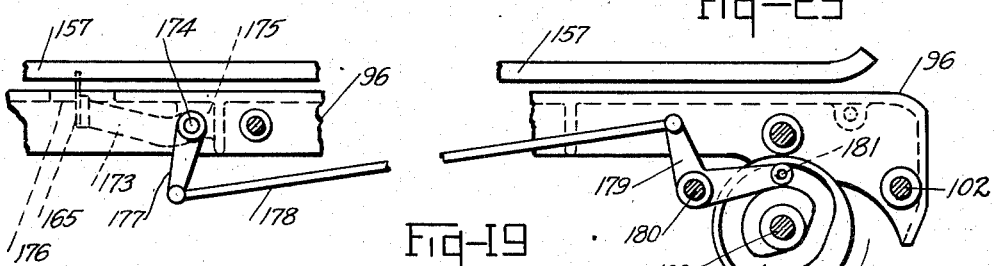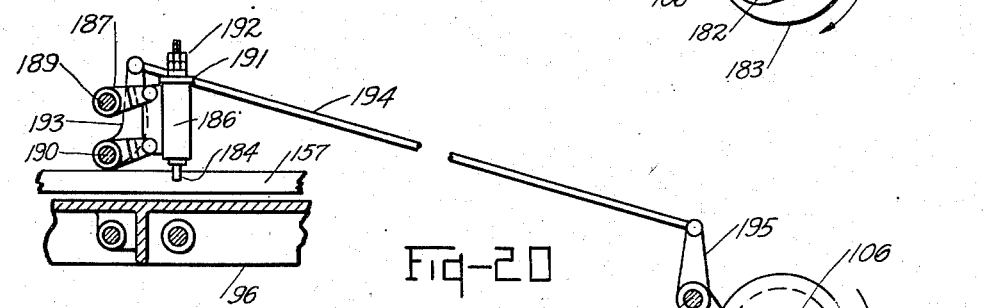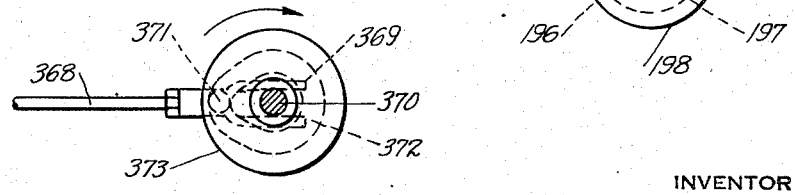

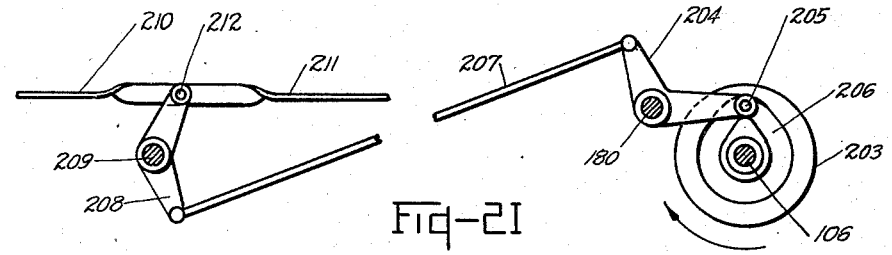
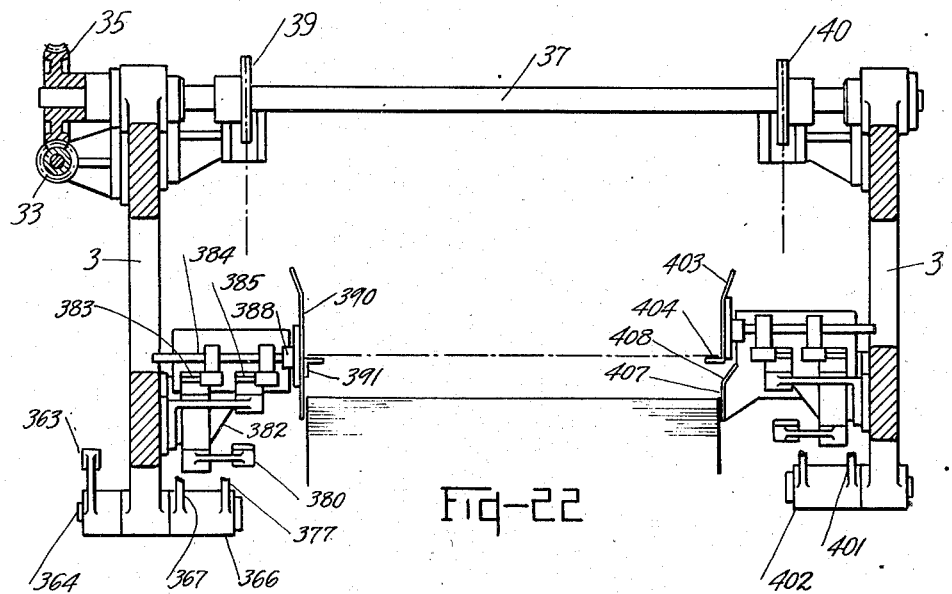
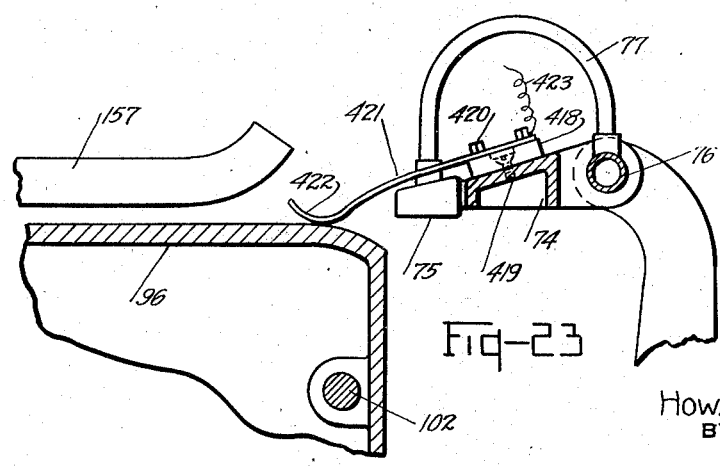

Patented Nov. 21, 1944

2,363,137

UNITED STATES PATENT OFFICE 2,363,137

METHOD AND APPARATUS FOR PRINTING

Howard H. Metcalf, Battle Creek, Mich.

Application June 30, 1941, Serial No. 400,498

28 Claims. (Cl. 101—120)

The present invention relates broadly to printing devices, and in its specific phases to a printing press having a rotary printing cylinder which incorporates a screen type of surface through which printing medium may be forced in a prescribed pattern by means of a suitable squeegee contained within the cylinder.

The so-called silk screen printing procedure has many advantages over ordinary printing methods, and particularly so when a relatively heavy layer of paint or other printing medium is to be transferred in a predetermined pattern upon an article for either decorative or other useful purposes. Its recognized advantages have given rise to a widespread commercial demand for silk screen printing but the use of this method of reproduction has been narrowly restricted due to the small volume of work obtainable by equipment now available for this purpose, as well as the high unit printing costs which must necessarily follow as a direct result of this small volume production. Small volume production and high unit costs are at present unavoidable, due to the fact that even the most modern existing silk screen printing equipment is non-automatic, and the work of reproduction in this manner must be either partially or wholly done by hand. The standard silk screen printing equipment generally consists of a hinged rectangular frame, on the bottom of which is stretched a silk screen, suitably prepared to permit paint or the like to be forced therethrough in a predetermined pattern by means of a suitable reciprocating squeegee. The sheet to be printed with such equipment is placed on a stationary bed over which the rectangular frame is hinged. Upon dropping the rectangular frame with its prepared screen bottom surface onto the sheet, followed by reciprocatory operation of the squeegee, the desired reproduction is left on the sheet, which may be removed as soon as the rectangular frame is lifted. Such printing procedure is far too slow to satisfy modern production requirements, causes great physical fatigue of the operator, and results in excessive waste of the printing medium due both to lack in uniformity of pressure applied to the squeegee, and evaporation and oxidation caused by exposure of the printing medium to the atmosphere. It must be recognized that the natural limitations of human muscular coordination, as well as the element of physical fatigue both definitely and positively limit the volume of work which can be produced by such or similar equipment. Exposure of both the screen frame and printing medium to the room atmosphere causes such medium to gum up the screen and other fluid contacting parts, thus making it difficult to clean up the assembly at the end of a run, or day's work. Operating in this manner moreover, causes considerable spoilage of printed sheets. These, as well as many other apparent difficulties, together with the unsatisfied demands for high speed, accurate and low cost silk screen printing, led to the making of this present invention.

Accordingly, among the objects of the present invention is the provision of a continuous system which utilizes and improves many of the standard so-called silk-screen printing practices, and further brings in additional practices and elements entirely new to the art.

Another object is to mount the screen on a rotary printing cylinder for continuous rotation.

Another object is to provide a rotary printing cylinder with screen thereon, wherein the central part of such cylinder remains stationary while the screen is moved around same by means of rotary end members.

Another object is to provide a rotary screen printing mechanism having a stationary but adjustable squeegee therein.

Another object is to provide new method features in the printing art, such as the method of rotary screen printing and the method of lubrication of the rotary screen under printing conditions.

Another object is to provide a rotary screen printing mechanism which makes line contact with the sheet being printed, and is adjustable to provide accurate registry relative to the starting edge of the sheet wherever same is needed.

Another object is to provide a screen type printing assembly adapted for continuous automatic operation including automatic paper feed, registry, rotary screen printing, and delivery of the printed sheets to the printed stock pile in uniform and orderly position.

A further object is to provide a screen printing mechanism wherein the adjustment of the squeegee is not affected by the adjustment of the mechanism for registry purposes.

A further object is to provide the rotary screen printing mechanism with a fixed location axis so that the adjustment of same will not be affected by the stopping or starting of the supply of sheets to be printed thereby.

A further object is to provide a printing impression cylinder mounted on an eccentric shaft so that the impression cylinder may be dropped as soon as there is a failure of sheet material passing between same and the screen type printing mechanism.

A further object is to provide a mechanism which automatically rotates an eccentric shaft, on which the impression cylinder is mounted, a part revolution as soon as there is a failure of supply of stock to be printed, and again automatically rotates said eccentric shaft back into impression position as soon as stock to be printed is again passing through the assembly.

A still further object is to provide better screen printing with less spoilage of stock, and at high speed suited to modern production requirements.

Still further objects and advantages will appear as the description proceeds.

To the accomplishment of the foregoing and related ends, the invention, then, consists of the steps and means hereinafter fully described and particularly pointed out in the claims, the annexed drawings and the following description setting forth in detail certain means and one mode of carrying out the invention, such disclosed means and mode illustrating, however, but one of the various ways in which the principle of the invention may be used.

In said annexed drawings:

Figures 1 and 2 together illustrate a composite side view of a preferred form of the apparatus of the present invention, such view being broken at the dot and dash line at the corresponding ends of the figures.

Figures 3 and 4 together illustrate a composite longitudinal section view of a preferred form of the apparatus shown in Figures 1, 2, 5, and 6, such view being broken at the dot and dash line at the corresponding ends of Figures 3 and 4, and taken along line 3—3 of Figure 5, and line 4—4 of Figure 6, looking in the direction of the arrows, certain parts being omitted for purposes of clarity of illustration.

Figures 5 and 6 together illustrate a composite top view of the apparatus shown in Figures 1, 2, 3, and 4, such view being broken at the dot and dash line at the corresponding ends of Figures 5 and 6, certain parts being omitted for purpose of clarity.

Figure 11 illustrates in enlarged top view a partial section of the cam mechanism shown in Figures 12 and 13 which raises and lowers the impression cylinder as required, such view being taken along line 11—11 of Figure 4, looking in the direction of the arrows.

Figure 12 illustrates an enlarged side view of the cam mechanism which raises and lowers the impression cylinder as required, said view being taken as looking into the lower face of Figure 11.

Figure 16 illustrates an enlarged side elevation of the screen carrying frame assembly.

Figure 17 is a scenographic side view, showing diagrammatically the general arrangement of various parts of the apparatus relative to other parts thereof, the whole being viewed from the same side as illustrated in the composite view of Figures 1 and 2.

Figure 18 illustrates an enlarged fragmentary and partially sectioned elevational view of the suction head elevating and lowering cam mechanism.

Figure 19 illustrates an enlarged side elevation of the first sheet stop together with the mechanism which operates same.

Figure 20 illustrates an enlarged partially sectioned side elevation of a sheet stabilizer together with the mechanism which operates same.

Figure 21 illustrates an enlarged elevational view of the mechanism which operates the side jogger assembly for the sheet on its way to the printing station.

Figure 22 illustrates a sectional view of the printed sheet receiving portion of the assembly as taken along line 22—22 of Figure 5, looking in the direction of the arrows, but omitting certain of the parts for purpose of clarity.

Figure 23 illustrates an enlarged vertical section through the upper portion of the initial sheet feeding mechanism with its electrical contactor mechanism as taken along line 23—23 of Figure 6, looking in the direction of the arrows.

Figure 24 illustrates an enlarged vertical section view of one of the side jogger cam assemblies of Figure 5.

Figure 25 illustrates an enlarged sectional view of the sheet stabilizer plunger mechanism shown externally in Figure 20.

Figure 1:
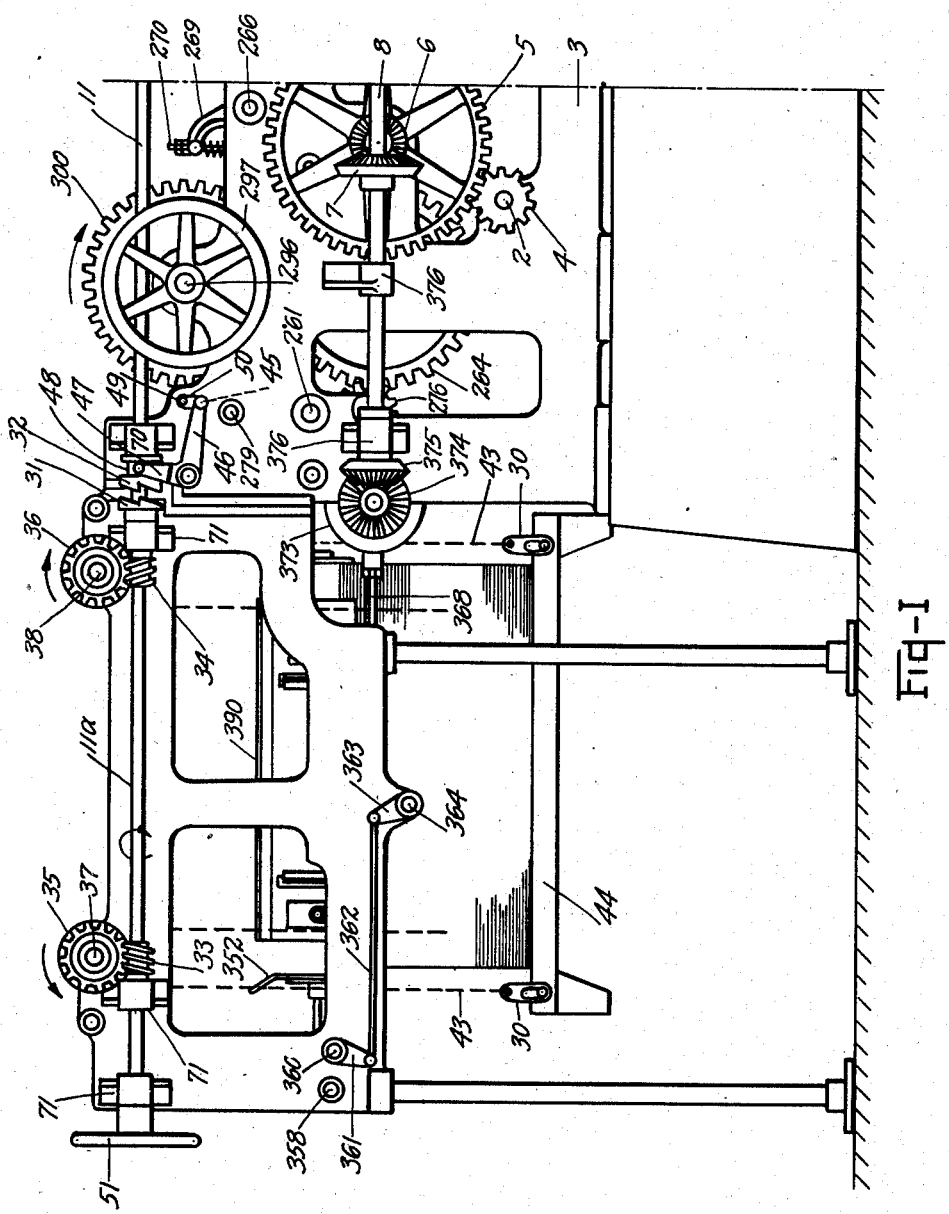

Referring to the scenographic side view shown in Figure 17, the sheet material to be printed is moved through the assembly in the direction of from right to left. More specifically, the sheets to be printed are transferred one at a time from the stock pile on the platform, shown at the right end of the figure, onto the sheet feed table where the sheet is carried to the notched-edge grippers which, at the proper time, forward the sheet to the printing station, and upon passing through same it is delivered onto the top of the stack of printed sheets on the platform at the left end of the figure. The operation of the various cooperating elements and parts which make possible the accomplishment of this flow of sheet material through the assembly will now be described in detail.

The apparatus may be driven in any conventional manner, for instance, by means of a belt drive to driving pulley 1 (Figure 5) mounted on shaft 2 (Figure 1) supported by suitable bearings (not shown) in main frame 3 of the assembly. On the opposite end of shaft 2 from that carrying driving pulley 1, is main drive pinion 4, which in turn meshes with gear 5 mounted on a suitable shaft 265. Miter gear pinion 6, which is keyed or otherwise rigidly attached to gear 5 for rotation in unison therewith, meshes with miter gear 7 which in turn is mounted on main drive shaft 8 in conventional manner for rotation in unison therewith. The whole assembly is operated in timed relation by means of suitable connections to main shaft 8.

Figure 2:
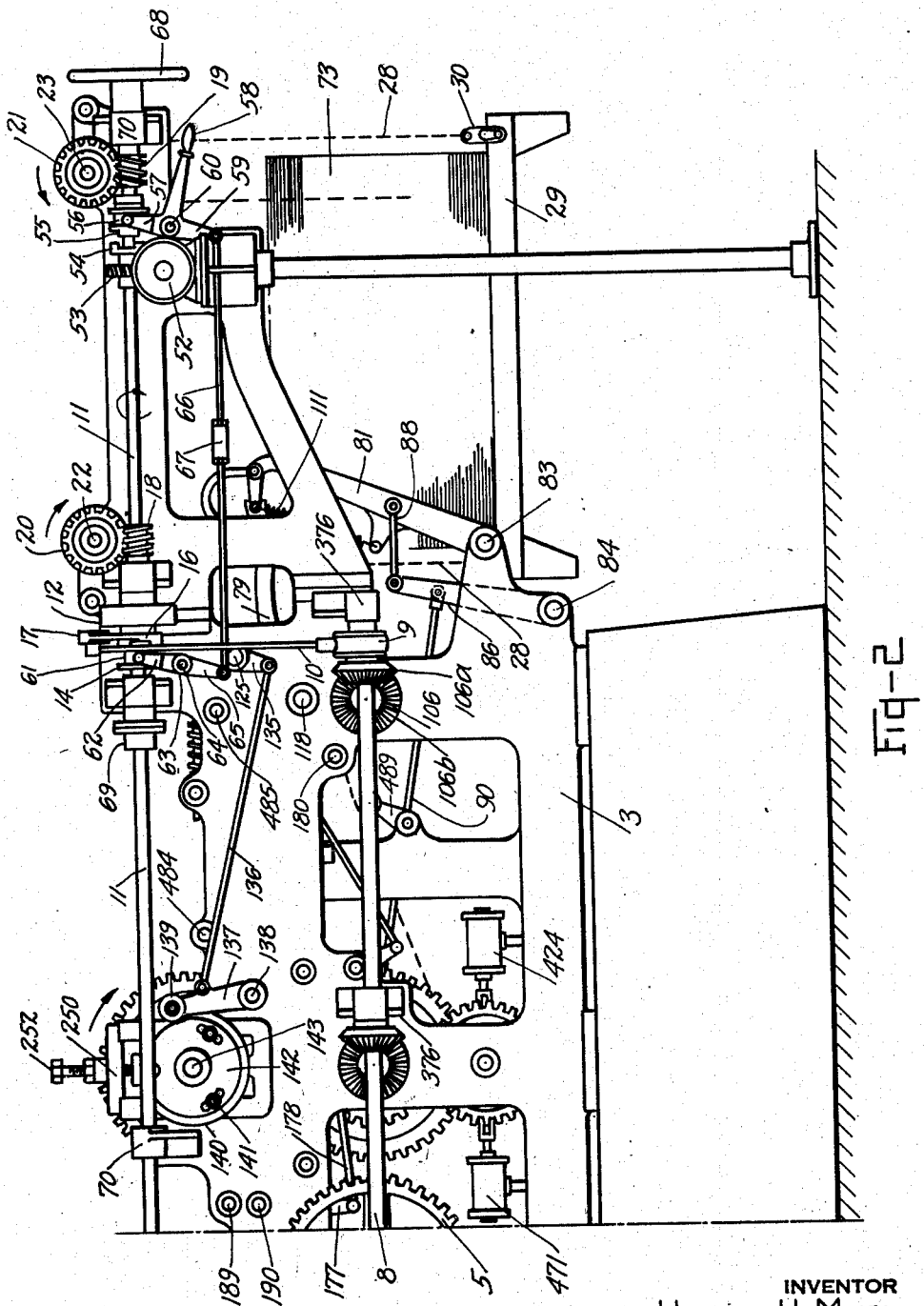

The platform raising and lowering mechanism is connected to the main drive shaft 8 by means of an eccentric 9 (Figure 2), and connecting rod 10 to a suitable one-way roller clutch assembly mounted on table raising and lowering drive shaft 11. The one-way roller clutch assembly comprises an overhung outer housing member 12 keyed or otherwise suitably fastened to shaft 11, and an inner member with extending hub 13 (Figure 6), one end of which has roller gripping members (not shown) within housing 12 while the other end of same is feather keyed to an endwise slideable jaw member 14. The other jaw member 15 is freely rotatable on the extending hub 13 of the clutch inner member. Extending from jaw member 15 is an operating arm 16 adjustably connected to the upper end of connecting rod 10 (Figure 2). This adjustment is accomplished by means of slotted portion 17 of arm 16 which permits fixed adjustment in conventional manner to vary the amount that shaft 11 is rotated for each rotation of main drive shaft 8. In the construction shown, platform raising and lowering shaft 11 is connected for counter-clockwise rotation as viewed from the right end of Figure 2. With shaft 11 operating in a counter-clockwise direction, worm pinions 18 and 19 mounted thereon will respectively rotate worm gear 20 in clockwise direction and worm gear 21 in a counter-clockwise direction, thus rotating shafts 22 and 23, to which these gears are joined, in corresponding directions. Shaft 22 is provided with chain sprockets 24 and 25 while shaft 23 is provided with chain sprockets 26 and 27. These four chain sprockets mesh with suitable platform supporting chains 28 (Figure 2) connected to platform 29 in any conventional manner, for instance, by means of connecting removable link and pin construction 30. With the construction shown, counter-clockwise rotation of shaft 11 will move stock platform 29 in an upward direction.

Referring to Figure 1 of the drawings, with shaft 11 rotating in counter-clockwise direction as described above, and with clutch jaws 31 and 32 in mesh, shaft 11a will also rotate in counter-clockwise direction. Under these conditions, worm pinions 33 and 34 mounted on shaft 11a will cause worm gear 35 to rotate in counter-clockwise direction and worm gear 36 to rotate in clockwise direction. Worm gear 35 is mounted on shaft 37 (Figure 5) while worm gear 36 is mounted on shaft 38. Shaft 37 carries chain sprockets 39 and 40 while shaft 38 carries chain sprockets 41 and 42. Platform supporting chains 43 (Figure 1) pass over these sprockets and are joined to platform 44 by means of suitable connecting means which, for instance, may be of removable link and pin construction 30. Operating in this manner, with shaft 11a rotating in counter-clockwise direction, platform 44 will be gradually lowered.

To provide for manual adjustment of the elevation of platform 44 (Figure 1) to meet the particular requirements involved at any particular time, a clutch operating lever 46 having a yoked upper end 47 engaging a suitable groove 48 in the hub of jaw member 32 may be used to cause the engagement and disengagement of clutch jaw members 31 and 32 at will. Jaw member 32 is preferably feather keyed to shaft 11 for rotation therewith, while jaw member 31 is fastened in fixed position on the end of shaft 11a. This type of construction permits shaft 11a to be independently rotated when jaw members 31 and 32 are disengaged, and to rotate in unison with shaft 11 when these jaw members are engaged. The holding of clutch operating lever 46 in either position may be accomplished in any conventional manner, for instance, by means of a spring projected plunger 45 mounted on lever 46 and adapted to engage suitable depressions 49 in boss 50 on frame 3. With jaw members 31 and 32 disengaged, platform 44 may be manually raised or lowered by rotation of hand wheel 51 and after the proper adjustment has been reached, clutch operating lever 46 may be again operated to reengage clutch jaws 31 and 32 thus causing platform 44 to be automatically lowered in step with the raising of platform 29.

In order to raise platform 29 (Figure 2) to initial operating position, or to lower same for reloading, it is desirable to provide power means to accomplish this end quickly. The disturbing of the elevated location of platform 44 under such conditions may be avoided by disengaging clutch jaws 31 and 32 (Figure 1). The auxiliary power drive for raising or lowering platform 29 (Figure 2) involves the use of a reversible electric motor 52 carrying a worm pinion meshing with the under side of worm gear 53 mounted for free rotation on shaft 11 and provided with conventional means to prevent endwise movement thereon. Fastened to worm gear 53 for free movement therewith is a jaw member 54 adapted to mesh with jaw member 55 feather keyed to shaft 11 for endwise movement thereon and rotation in unison therewith. Jaw member 55 (Figure 2) is provided with a groove 56 adapted to be engaged by the yoke end 57 of clutch operating lever 58. This clutch operating lever has an arm 59 extending substantially opposite to yoke end 57, the whole assembly being pivoted on a suitable fulcrum pin 60 or the like. Jaw member 14 is provided with a groove 61 (Figure 2) engaged by yoke end 62 of clutch operating lever 63. This clutch operating lever is mounted on a suitable fulcrum pin 64 or the like, and is provided with an arm 65 extending substantially in opposite direction to yoke end 62. The lower end of extending arm 65 and the lower end of clutch operating lever arm 59 are pivotally connected together by means of a connecting rod 66 having a suitable right and left hand threaded turnbuckle 67 for use in adjusting the mechanism for proper timed operation. When the auxiliary drive is to be used for either raising or lowering platform 29, lever 58 is moved in counter-clockwise direction to cause clutch jaw members 54 and 55 to engage, and clutch jaw members 14 and 15 (Figure 6) to disengage. Then by starting motor 52 in the required direction, platform 29 will be raised or lowered as desired and when the adjustment is complete, motor 52 is turned off, and lever 58 (Figure 2) operated to disengage jaws 54 and 55 and reengage jaws 14 and 15, whereupon the apparatus is again ready for automatic operation. Hand wheel 68 (Figure 2) is provided for use when minor hand adjustment of the location of platform 29 is desired. For simplicity of assembly and construction, shaft 11 is preferably made in two parts joined by a conventional coupling 69. Shaft 11 as shown is conventionally mounted on suitable bearings 70, while shaft 11a is conventionally mounted on suitable bearings 71. Chain guide brackets 72 (Figures 5 and 6) may be provided to hold platform supporting chains 28 and 43 on the respective sprockets.

Figure 8:
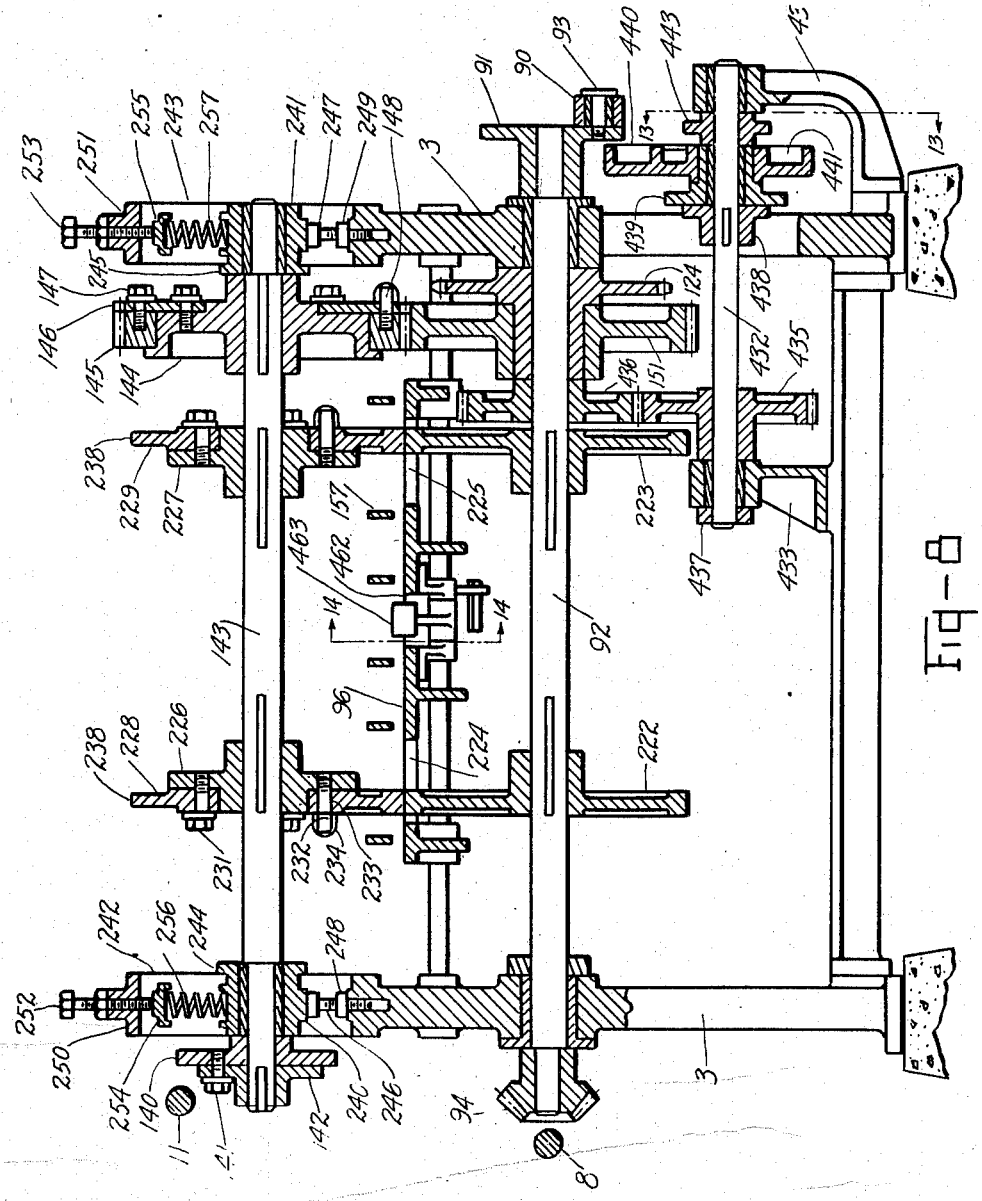
Figure 8 illustrates an enlarged vertical section through the apparatus as taken at line 8—8 of Figures 4 and 6, looking in the direction of the arrows.

The transferring of the sheet material 73 from the supply stack of same carried by platform 29, is accomplished by means of suction in conventional manner. A typical mechanism of this nature consists of a suction head 74 (Figures 6 and 23) which carries suction inlets 75 connected to suction header 76 by means of tubular members 77, which are preferably in the form of flexible hose. One end of this suction header is joined by means of hose 78 to a suitable suction timing and controlling device of conventional construction (not shown) which applies suction pressure through header 76 and tubular members 77 to suction inlets 75 when same are in position to pick up and transfer the upper sheet of the stack of sheet material 73. This lifting and carrying suction is maintained until the leading edge of the sheet has been transferred the desired distance into the machine whereupon the suction is released to drop the sheet. Suction head 74 then returns to initial position ready for repeating the cycle. For convenience of operation the leading edge of the suction assembly is supported at one end thereof by means supporting cam member 79 (Figure 4), the details and operation of which will be hereinafter described in connection with Figure 18. Suction header 76 is pivotally supported at the ends thereof on levers 80 and 81 (Figure 6), while the lower ends of said levers are pivotally connected to main frame 3 by means of fulcrum pins 82 (Figure 4) and 83 (Figure 2). Cross shaft 84 (Figures 2 and 4) has arm members 85 and 86 pinned or otherwise conventionally fastened thereto for movement therewith. The upper end of arms 85 and 86 are pivotally connected to links 87 and 88 which in turn are pivotally connected to levers 80 and 81. One end of shaft 84 has an arm member 89 (Figure 6) keyed or otherwise suitably fastened thereto, and the upper end of this arm member is pivotally connected to connecting rod 90, the opposite end of which is pivotally connected to crank disc 91 by means of crank pin 93 (Figure 8). Crank disc 91 in turn is keyed or otherwise suitably fastened on the end of shaft 92. The opposite end of this shaft has miter gear 94 keyed or otherwise suitably fastened thereto. Miter gear 94 in turn meshes with miter gear 95 (Figure 6) which is keyed to main drive shaft 8. It is thus to be seen that rotation of main drive shaft 8 will automatically cause the suction head assembly 74 to move back and forth in automatic timed relation for transferring sheet material 73 from platform 29 to the mechanism for subsequently handling said sheet.

Supporting cam member 79 (Figures 4 and 18) is pivotally mounted at one end on sheet feed table 96 by means of fulcrum stud 97. The opposite end of supporting cam member 79 is connected by means of pivot pin 98 to link 99 which in turn is pivotally connected to cam lever 100 by means of pivot pin 101. Cam lever 100 is mounted on shaft 102 while the opposite end of cam lever 100 from that carrying pivot pin 101 is provided with a cam roller 103, adapted to travel in raceway 104 of cam member 105 mounted in fixed position on cam shaft 106. This shaft has miter gear 106b mounted thereon and in mesh with miter gear 106a (Figures 3 and 6) mounted on main shaft 8 for driving the cam shaft assembly. The suction head 74 (Figure 6) is connected to suction header 76 which in turn is pivotally mounted on bosses 107 and 108 at the upper ends of levers 80 and 81 respectively. Connected to suction header 76 is cam shoe member 109 having cam shoe 110 on its free end. This cam shoe is normally adapted to slide on supporting cam member 79. Cam shoe 110 is held in contact with supporting cam member 79 through a major portion of its travel by means of a tension spring 111 (Figures 2, 4, and 18) connected at its upper end to cam shoe lever 109 by means of spring anchor 112 (Figure 6), and at its lower end to extending arm 113 (Figure 4) of lever 80 by means of spring anchor 114. In operation, after suction inlets 75 have contacted and gripped the sheet to be delivered onto sheet feed table 96, suction head 74 moves toward sheet feed table 96 and is supported during at least a major portion of its travel on supporting cam member 79 by means of cam shoe 110. In step with this forward movement, the supporting cam member 79 is elevated at one end by means of cam lever 100 (Figure 18) which is actuated due to rotation of cam 105 with cam roller 103 in raceway 104. This lifts the leading edge of the sheet being delivered so that same will be laid on top of sheet feed table 96 ready for forward travel the moment that the suction pressure is released. This procedure makes certain that the leading edge of the sheet being forwarded will be properly delivered onto the sheet feed table regardless of minor variations from the optimum elevation of the top of the stack of sheet material 73. Upon return of suction head 74 towards initial position, the further rotation of cam 105, through its connection to supporting member 79, lowers the suction head so that suction inlets 75 under the influence of spring 111 will again contact the upper face of the leading edge of the next sheet to be transferred.

Figure 4:
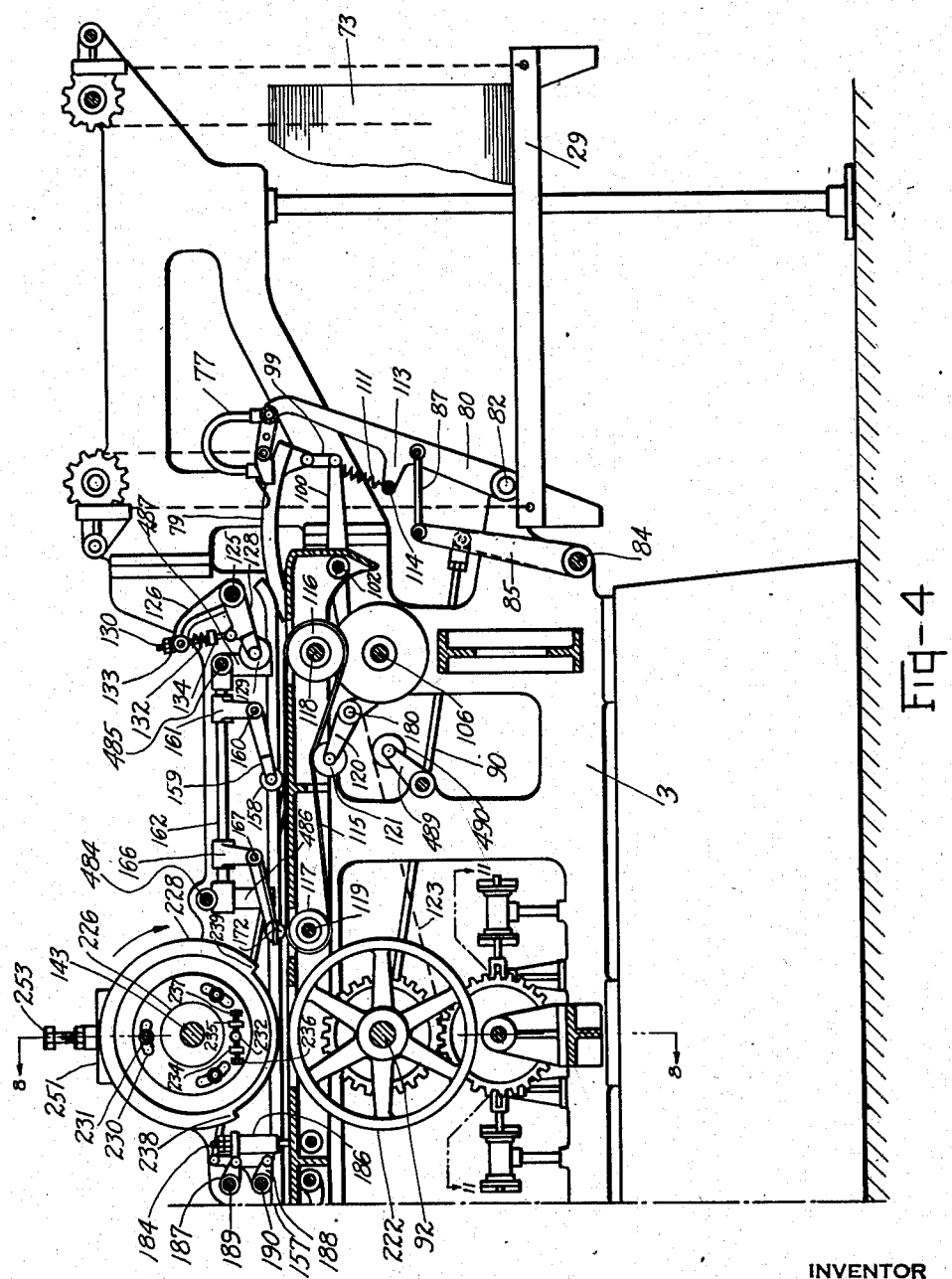

The sheet receiving end of sheet feed table 96 is provided with a plurality of sheet drive tapes 115 (Figure 4). These tapes are mounted on driving pulleys 116 and idler pulleys 117 mounted respectively on tape pulley shafts 118 and 119. Driving pulleys 116 are keyed or otherwise fastened to tape drive shaft 118 for positive drive at uniform tape speeds. Tapes 115 may be kept tightened by means of individual tightener mechanisms 120 carrying take-up rollers 121 in contact with tapes 115. Shaft 118 (Figure 6) has a chain sprocket 122 mounted thereon, and this sprocket is connected by means of chain 123 to driving sprocket 124 mounted on shaft 92 (Figure 8) which in turn is driven by means of main shaft 8 as has been previously described. For convenience of operation, tapes 115 pass through suitable openings in the sheet feed table and ride directly on top thereof. Chain 123 may be tightened in any suitable manner and one convenient tightening mechanism consists of a pivoted arm 489 (Figure 4) with roller 490 in engagement with said chain.

In forwarding the sheet delivered onto the sheet feed table, a suitable mechanism is employed for gripping the sheet against moving tapes 115. The operation of this gripping mechanism will now be described in detail. Keyed to shaft 125 (Figures 4 and 6) are a plurality of spring lever arms 126 corresponding in number with the number of tapes employed and suitably positioned relative thereto. Located between spring lever arm 126 and collar 127 is a spring roller arm 128 carrying a roller 129 mounted for rotation in the yoked end of said roller arm. Each of these rollers 129 is positioned directly over a corresponding tape 115. Spring roller arm 128 has pivotally mounted thereon a spring rod 130 which passes through a swivel stud 131 connected to the free end of spring lever arm 126. The spring rod carries thereon a compression spring 132 and is provided with adjusting nuts 133 for adjusting the elevation of roller 129 when same is in elevated position so that the series of these rollers will all operate in unison. An adjustable thrust collar 134 is preferably used on each of the spring rods 130 to provide suitable tension on each of the compression springs 132.

Shaft 125 (Figure 2) has arm 135 adjustably clamped or otherwise fastened thereto in conventional manner. Connecting rod 136 is pivotally connected at one end to arm 135, and at the other end to cam roller arm 137, the lower end of which is mounted on a fulcrum stud 138 while the upper end carries cam roller 139 in contact with open cam 140 which is joined by adjustable members 141 to cam back 142 mounted on shaft 143. Shaft 143 (Figure 8) has a gear hub 144 keyed thereto and this hub carries on its periphery a ring gear 145 and a back lash gear 146. These gears are adjustably joined to each other and to gear hub 144 by means of studs 147. The adjustment of these members relative to each other is facilitated by the use of a tappet 148 and adjusting screws in contact therewith, said adjusting screws preferably being mounted as shown in Figure 4 in connection with tappet 232 and screws 236 and 237. Gears 145 and 146 (Figure 8), in turn mesh with gear 151 conventionally fastened to shaft 92 which is driven from main drive shaft 8 as hereinbefore described. Shaft 125 (Figure 6) has a spring lever 152 fastened for rotation therewith in conventional manner. On the upper end of spring lever 152 is pivotally mounted spring rod 153 carrying compression spring 154. The free end of this spring rod 153 is slidably mounted in swivel stud 155. Suitable tension for compression spring 154 may be provided through the use of adjustable collar 156. Compression spring 154 thus holds cam roller 139 (Figure 2) in contact with the cam face of cam 140.

In operation, tapes 115 (Figure 4) run continuously, and as the leading edge of a sheet is being carried onto the sheet feed table 96 and under the upwardly curved ends of paper guide bars 157, cam 140 (Figure 2), through the connecting linkage, rotates shaft 125 (Figure 4) so as to lift rollers 129 away from tapes 115 so that the leading edge of the sheet may pass therebetween. In step with the release of the suction holding the sheet to the suction head, cam 140 rotates shaft 125 so as to bring rollers 129 into contact with the upper face of the sheet and force same down onto sheet feed tapes 125, thus giving positive driving traction for the sheet. Fixed shafts 266 (Figure 5), 484 (Figure 6), and 485, which are anchored at their ends to main frame 3, have sidewise adjustable members 486, 487, and 488 respectively mounted thereon. Sheet guide bars 157 are joined to said adjustable members in conventional manner so that said guide bars are spaced the desired distance above sheet feed table 96 to guide thereover the sheets which are on their way to the printing station.

Figure 3:
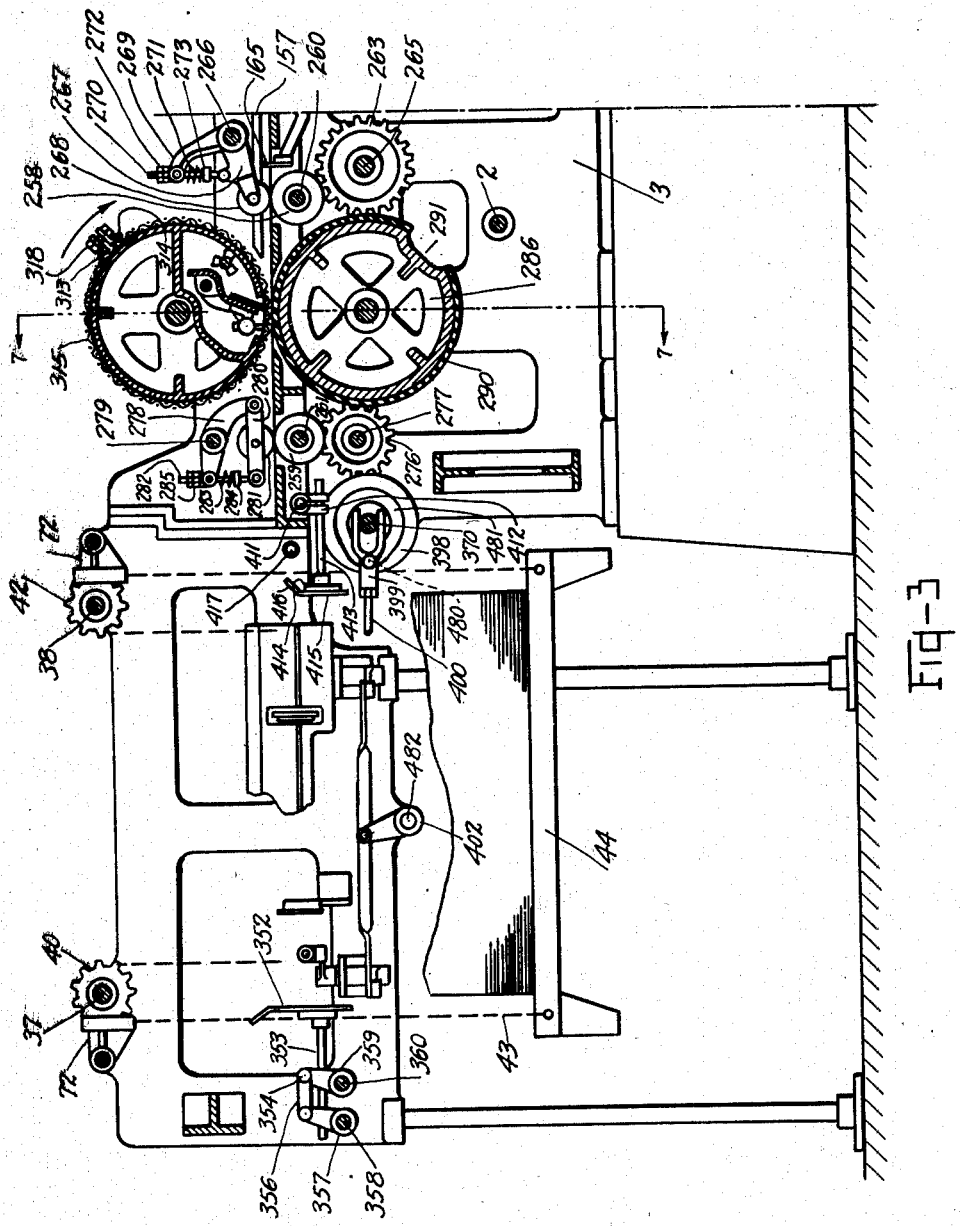
Figure 5:
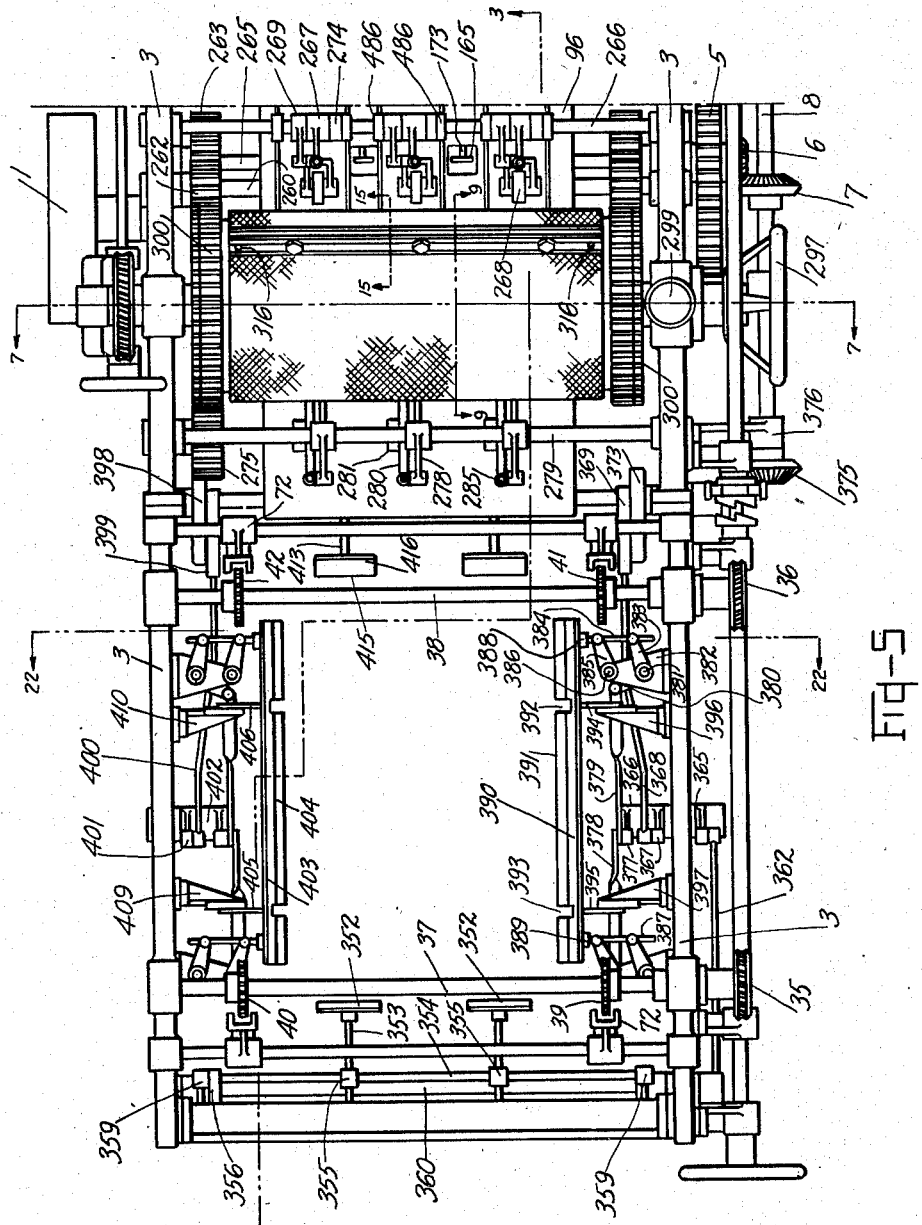

Continued driving traction is provided by idler rollers 158 mounted on arms 159, which in turn are pivotally mounted on shaft 160 which is carried by a yoked supporting member 161 adjustably mounted in conventional manner on shaft 162. Rollers 158 press the sheet onto driving tapes 115 under pressure exerted by tortional springs 163 (Figure 6) anchored both to arms 159 and adjustable tension collars 164 mounted on shaft 160. The position to which rollers 158 are adjusted, determines the end of the forced feed of the incoming sheet through the agency of tapes 115. In actual operation, yoke supporting member 161 is adjusted on shaft 162 so that substantially the moment the sheet passes completely under rollers 158, which terminates the forced delivery of the sheet, the sheet will stop and will be in delivered position with its leading edge up against sheet stop plate 165 (Figures 3 and 5).

In order to retard the sheet so that it stops at the proper time with the leading edge of the sheet up against sheet stop plate 165 and yet permits sidewise jogging of the sheet, a sheet retarder mechanism with ball contactors is utilized. This sheet retarder mechanism, in preferred form, consists of a yoke 166 (Figures 4 and 6) adjustably mounted on shaft 162. Extending through yoke 166 is a cross shaft 167 on the ends of which sheet retarder arms 168 and 169 are pivotally mounted in conventional manner. The free ends of these arms are respectively provided with socket members 170 and 171, which in turn are fitted with freely rotatable retarder balls 172. In use the sheet retarder assembly is adjusted on shaft 162 to meet the particular requirements of the type of sheet being delivered so that the retarding effect of the balls pressing on the sheet will be of positive aid in checking movement of the sheet at the desired time and will aid in holding same on the sheet feed table 96 against which the balls directly press it.

Referring to Figure 19, sheet stop plate 165 is mounted on sheet stop arm 173 which in turn is keyed or otherwise fastened to shaft 174 supported on suitable bosses 175 which for convenience may be an integral part of sheet feed table 96. In preferred construction, a pair of sheet stop arms 173 (Figure 5), with a sheet stop plate 165 mounted on the end of each, are used for stopping the sheet. Openings 176 (Figure 19) are provided in sheet feed table 96 to permit the upper end of sheet stop plates 165 to pass up therethrough for sheet stopping purposes. Keyed or otherwise suitably fastened to shaft 174 is a sheet stop operating lever 177. Pivotally connected to the lower end of sheet stop operating lever 177 is a connecting rod 178, the other end of which is pivotally connected to one arm of bell-crank 179 mounted for free rotation on shaft 180. The other arm of the bell-crank carries cam roller 181 adapted to move in raceway 182 of cam 183, which in turn is keyed or otherwise suitably fastened on cam shaft 106, the operation of which has been previously described. In operation the sheet stop assembly is timed so that the sheet stop plate 165 is projected upward just before the leading edge of the sheet which it is to stop comes up against it. Such sheet when it comes to rest, lies on sheet feed table 96 and below sheet guide bars 157. In order to prevent the leading edge of the sheet from riding over the top of sheet stop plates 165, they are preferably made of a length such that when they are in their upper position, they will extend above the lower edge of sheet guide bars 157.

Figure 6:
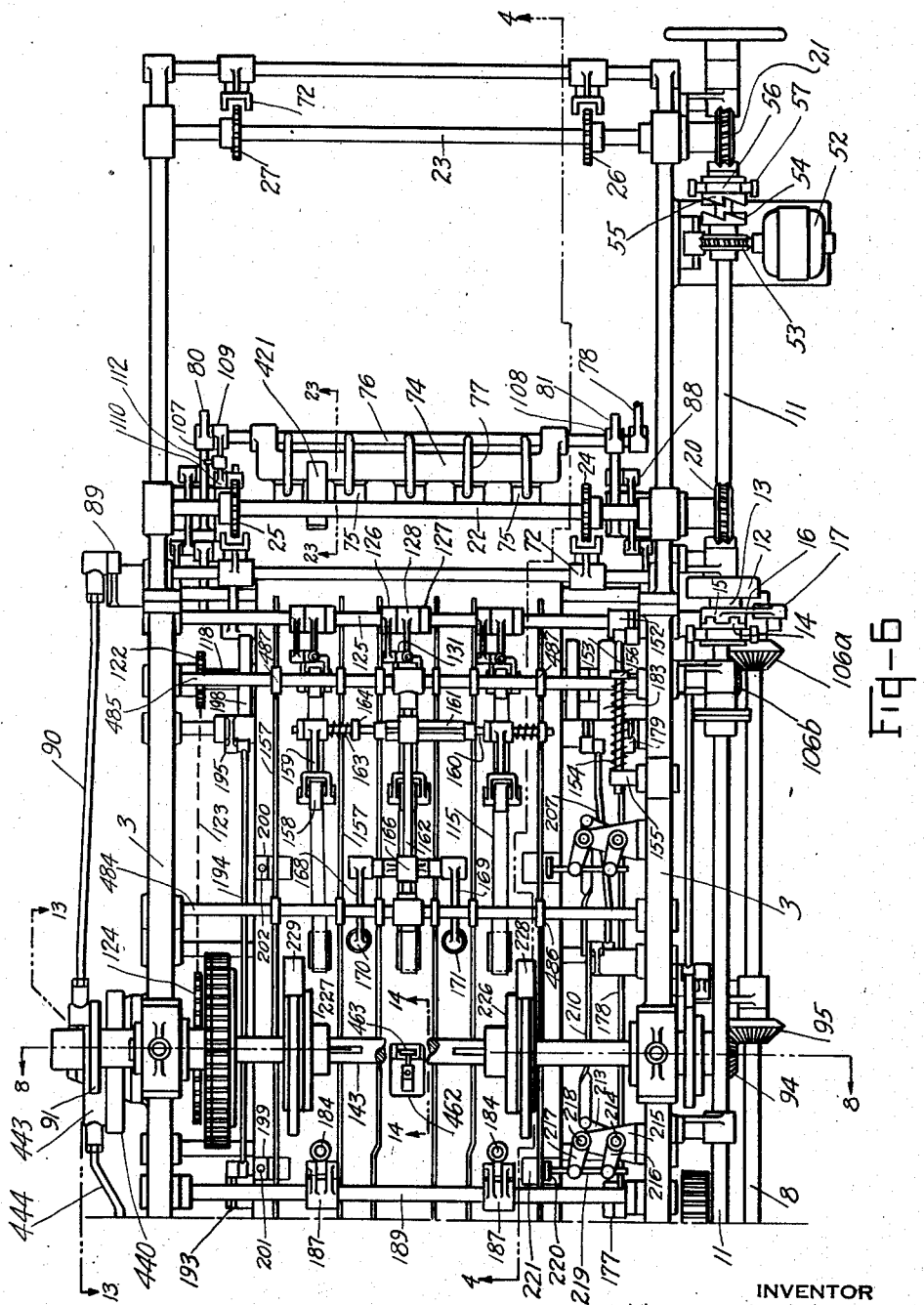

When the leading edge of the sheet comes in contact with sheet stop plate 165 (Figure 19), a sheet quieting mechanism (Figure 20) immediately clamps the sheet to sheet feed table 96 and then at once releases same. This clamping action arrests the kinetic energy given the sheet by the driving mechanism which has delivered it against sheet stop plates 165, thus bringing the sheet substantially to a state of complete rest. This mechanism consists of a plunger 184 (Figures 4, 20, and 25) preferably loaded by means of a compression spring 185 carried in suitable housing 186 pivotally joined to yoked lever arms 187 and 188, the former being freely rotatable on shaft 189 while the latter is keyed or otherwise fastened to shaft 190. This construction holds housing 186 securely in upright position through the up and down movement of same. The upper end of housing 186 is provided with a closing cap 191 through which the upper end of plunger rod 184 extends. Nuts 192 threadedly engage the upper end of plunger rod 184 and provide for vertical adjustment of same. In preferred construction at least two of these assemblies are mounted on shaft 190 as is shown in Figure 6. Mounted in fixed position on shaft 190 (Figures 6 and 20) is an operating lever 193 which is pivotally connected to connecting rod 194, the free end of which is pivotally connected to one arm of bell-crank 195 which in turn is freely rotatable on shaft 180. The free arm of bell-crank 195 carries cam roller 196 adapted to move in raceway 197 of cam 198 which is keyed or otherwise mounted in fixed location on shaft 106, the operation of which has been previously described. In operation, cam 198 through the agency of the connecting linkage, will at the proper time, momentarily lower housing 186 and cause the lower end of plunger rod 184 to clamp the sheet of stock against sheet feed table 96 and then immediately rise to release the sheet which has thus been quieted. Under normal operating conditions, plunger rod 184 is adjusted by means of nuts 192 so that when housing 186 is in its normal upper position, the lower end of plunger rod 184 will be above the lower edge of sheet guide bars 157, thus providing a clear passageway for sheets being delivered thereunder.

The moment that plunger rods 184 are lifted sufficiently to release the sheet of stock at the end of the quieting or flutter removing step, a side jogging mechanism goes into operation. In order that the sheet will be in exact position when fed through the printing step which will be hereinafter described, the sheet is lined up for this purpose. To accomplish this, a pair of fixed stops 199 and 200 (Figure 6) are mounted on sheet feed table 96 at one edge thereof. These stops are provided with adjusting studs 201 and 202 adapted for adjustment of the stops to or from the normal side edge position of the sheet in conventional manner. At the opposite side of sheet feed table 96 is provided a side jogging mechanism for jogging the sheet up against stops 199 and 200. This mechanism in preferred construction consists of a cam 203 (Figure 21) mounted in fixed position on cam shaft 106 which has previously been described. Bell-crank 204 mounted on shaft 180, which has been previously described, has a cam roller 205 mounted on one arm thereof and such roller is adapted to move in raceway 206. The other arm of bell-crank 204 is pivotally connected to connecting rod 207, the opposite end of which is in turn pivotally connected to the lower arm of bell-crank 208 which is pivotally mounted on fulcrum pin 209 which is rigidly secured to frame 3. The upper end of bell-crank 208 is pivotally connected to links 210 and 211 (Figures 6 and 21) by means of pivot pin 212. The opposite end of link 210 is pivotally connected to arm 213 (Figure 6) which in turn is keyed or otherwise fastened to shaft 214 which is supported on bracket 215. The opposite end of shaft 214 has an arm 216 fastened thereto. A like arm 217 is mounted on bracket 215 by means of pivot pin 218. Pivotally joined in conventional manner on the free ends of arms 216 and 217 is an adjustably positioned pusher rod 219 carrying jogger head 220 on the end thereof. This jogger head is adapted to be moved back and forth in the cut-away portion 221 of sheet feed table 96 with the pushing face of jogger head 220 extending above and below the upper face of the sheet feed table. Link 211 is shown and is preferably connected to a second jogger mechanism in identical manner to the one which has just been described and accordingly, to avoid duplication, a detailed description of same will be omitted. With the apparatus adjusted and properly timed, the jogger mechanism at the moment of release of the sheet by plungers 184 will jog the sheet sidewise up against fixed stops 199 and 200, thus placing the sheet accurately in position for forwarding to the printing station.

After the sheet has been fed onto the sheet feed table 96, guided and jogged to position for forwarding, the sheet gripping mechanism goes into action to grip and forward the sheet at the proper time to the printing station. Referring to Figure 8, shaft 92 which is driven by main shaft 8 has adjustably keyed thereon a pair of corresponding gripper discs 222 and 223. The upper edge of these gripper discs extend through openings 224 and 225 in sheet feed table 96 with the upper end of these discs substantially flush with the upper face of the sheet feed table. By having gripper discs 222 and 223 keyed for endwise adjustable movement on shaft 92, the adjustment of the mechanism for handling different width sheets is facilitated. Shaft 143 is mounted directly above shaft 92 and driven from the latter by means of gear 151 and ring gear 145 as has been previously described. A pair of gripper driving plates 226 and 227 are mounted for endwise adjustment on shaft 143 and respectively carry notched or cut-away edge grippers 228 and 229. For the purpose of adjusting each gripper individually on its corresponding gripper driving plate, each gripper is provided with slots 230 (Figure 4) through which cap screws 231 pass and threadedly engage the gripper driving plate. Tappet 232 (Figure 8) threadedly engages the gripper driving plate and passes through a slot 233 in the gripper similar to slots 230. Mounted on the gripper at each end of slot 233 are threaded projecting ears 234 and 235 (Figure 4) through which respectively pass adjusting screws 236 and 237. It is thus to be seen that by loosening cap screws 231 and then turning adjusting screws 236 and 237, the corresponding gripper may be rotated on its driving plate to adjust same to suit the particular requirements at hand. In order to leave the sheet delivered onto the sheet feed table free for initial forwarding, stopping, side jogging, etc., the grippers 228 and 229 are provided with a cut-away portion 238 as shown in end view in Figure 4. The length and location of the cutaway portion is governed largely by the particular requirements involved as well as the relative position and timing of the various mechanisms operating on the sheet before same is forwarded to the printing station. In other words the cutaway portion 238 must permit the sheets delivered into the machine to move until its leading edge comes up against sheet stop plates 165, freely allow it to be positioned for forwarding to the printing station, and then at the proper moment to grip the sheet and commence such forwarding. This type of construction also makes possible exactly timed positive gripping of the sheet at the time the second forwarding step is to begin. Such second forwarding commences the moment that driving shoulder 239 (Figure 4) of grippers 228 and 229 engages the sheet and binds same into driving contact onto the corresponding gripper disc therebelow.

In order to provide for proper clearance between the gripper and gripper discs as well as to take care of variations in the thickness of the sheet stock to be handled, shaft 143 (Figure 8) is mounted on bearing boxes 240 and 241 respectively fitting ways 242 and 243 in the corresponding side members of the main frame 3. To maintain the assembly against undesired side movement, bearing boxes 240 and 241 are respectively provided with flanges 244 and 245 which bear against the edges of ways 242 and 243. Bearing boxes 240 and 241 are respectively supported on adjusting screws 246 and 247 provided with lock nuts 248 and 249 for supporting the assembly in position after adjustment. The upper end of ways 242 and 243 are provided with tie bars 250 and 251 through which pass spring tension screws 252 and 253. These screws respectively carry spring caps 254 and 255 which in turn hold the upper ends of compression springs 256 and 257 which bear against the upper surfaces of bearing boxes 240 and 241. Mounting shaft 143 in this manner permits same to be raised slightly by the sheet passing between the gripper and gripper discs, which in turn are normally adjusted with a space therebetween just slightly less than the thickness of the sheet to provide positive gripping action thereon.

The positive feed of the sheet to, through, and from the printing station is accomplished by means of propeller rollers 258 and 259 (Figure 3) keyed respectively to shafts 260 and 261 and adapted for endwise adjustment thereon. Shaft 260 carries pinion 262 (Figure 5) which meshes with gear 263 (Figure 3) which in turn meshes with gear 264 (Figure 1) for positive drive thereby. Gear 263 (Figure 3) is mounted on shaft 265 (Figure 5). Mounted on fixed shaft 266 (Figure 3), for free rotation as well as endwise adjustment thereon, are spring roller arms 267 on the forked end of each of which is rotatably mounted a trolley roller 268 which is adapted to grip a sheet passing through the mechanism onto propeller rollers 258. Mounted in fixed endwise adjustable position on shaft 266 are spring lever arms 269. Pivotally joining spring roller arm 267 to spring lever arm 269 is a spring rod 270 carrying compression spring 271. The vertical adjustment of trolley roller 268 is accomplished by means of adjusting nuts 272 while the spring tension is controlled by the adjustment of thrust collar 273. The endwise adjustment of the trolley roller and spring lever arm assembly is accomplished by means of thrust collar 274 (Figure 5) and suitable set screws (not shown) gripping spring lever arm 269 to shaft 266.

Shaft 261 (Figure 3) carrying propeller roller 259 for rotation therewith has gear 275 (Figure 5) keyed thereto and in mesh with gear 276 (Figure 3) which meshes with gear 264 (Figure 1) and is driven thereby. Mounted above propeller roller 259 (Figure 3) is a trolley roller assembly which acts in conjunction with propeller roller 259 to deliver the sheet from the printing station to the printed sheet receiving station. The trolley roller assembly consists of trolley supporting arms 278, each of which are mounted in fixed but endwise adjustable position on shaft 279. Pivotally joined to one end of trolley supporting arm 278 is a supporting member 280 carrying rotatable trolley roller 281, such trolley roller being normally mounted directly above propeller roller 259. Pivotally joined to the free end of supporting member 280 is spring rod 282 which is adjustably joined in conventional manner to trolley supporting arm 278. Compression spring 283 together with thrust collar 284 controls the tension with which the now printed sheet is gripped by trolley roller 281 onto propeller roller 259. The adjustment of trolley roller 281 relative to propeller roller 259 is accomplished by means of adjusting nuts 285 mounted on the upper end of spring rod 282. With this type of construction, trolley roller 281 grips the printed sheet onto propeller roller 259 and delivers same from the printing station to the printed sheet receiving station.

Shaft 265 (Figure 3) is driven through gear 5 (Figure 1) mounted thereon which in turn meshes with gear 4 connected by a key or the like to shaft 2 which carries main drive pulley 1 (Figure 5). Shaft 265 thus being positively driven, acts through gears 263 (Figure 3) in mesh with gears 264 (Figures 1 and 7) to positively drive impression cylinder 286. Gears 264 are preferably in the form of ring gears as typically illustrated in Figure 7. In preferred construction, the ring gears are adjustably joined to back lash gears 287 which in turn are adjustably joined to gear hubs 288. In order to facilitate adjustment and register of the printing cylinder to be hereinafter described, the ring gear, back lash gear, and hub assembly may be provided with conventional adjusting means such as is typically shown for instance in Figure 4 in connection with gripper 228 and gripper driving plate 226. Gear hubs 288 (Figure 7) are joined to impression cylinder 286 in conventional manner, for instance by means of cap screws 289. The outer face of impression cylinder 286 is preferably provided with an impression cylinder blanket 290 as typically shown in Figures 3 and 7. The impression cylinder blanket 290 may be in the form of rubber or other suitable substance securely fastened to the outer face of impression cylinder 286. Impression cylinder 286 is provided with a depression 291 (Figure 3) to provide clearance for lock-up angle members 313, 314, and lock-up screws 318, and such depression must be of sufficient length to take care of adjustment of the printing cylinder for registry purposes. Gear hubs 288 (Figure 7) are provided with bushings 292 which in turn are freely rotatable on impression cylinder shaft 293 which has eccentric ends 294 mounted for free rotation in bushings 295 in the side members of main frame 3.

Figure 7:
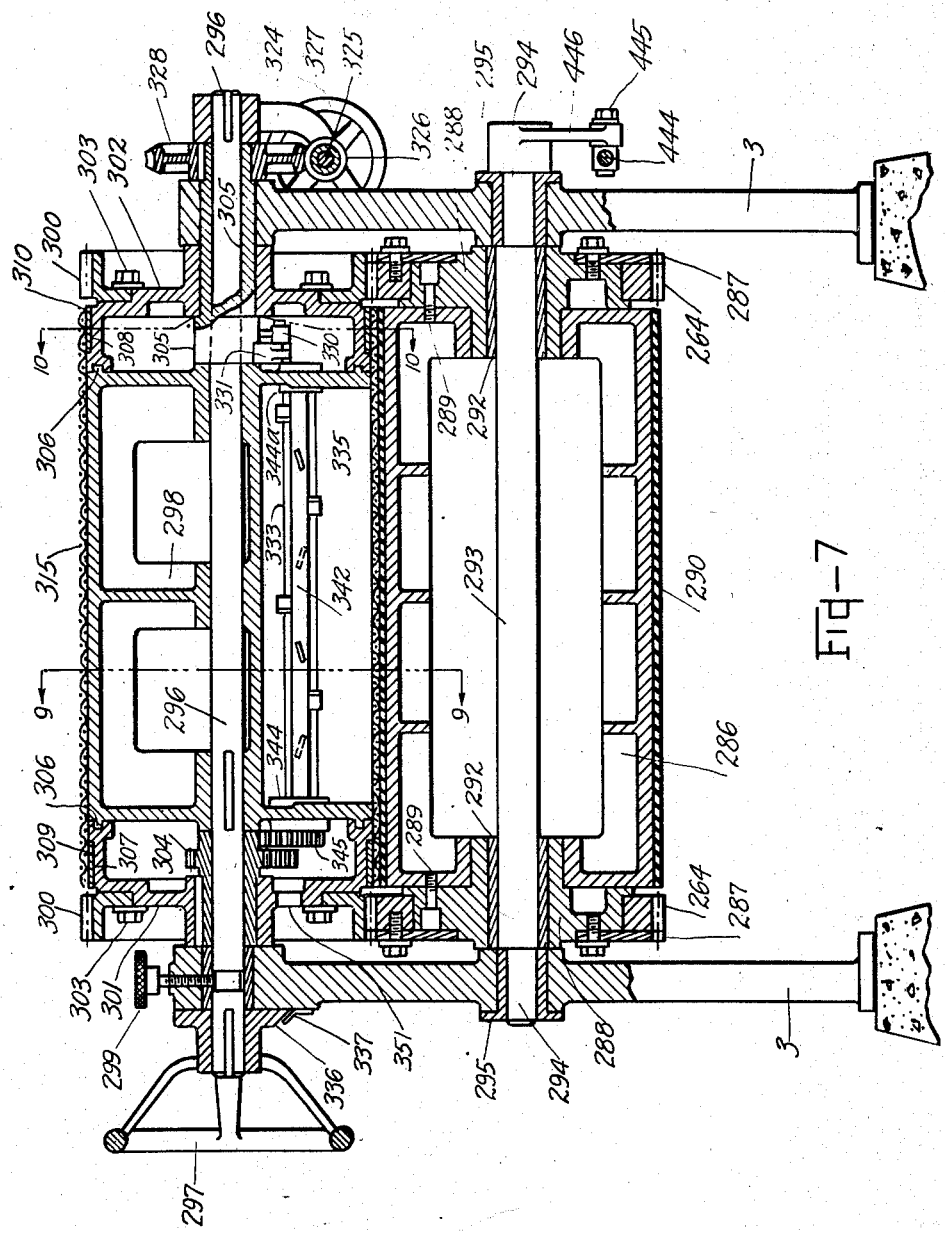
Figure 7 illustrates an enlarged vertical section through the apparatus as taken at line 7—7 of Figures 3 and 5, looking in the direction of the arrows.
Figure 15:
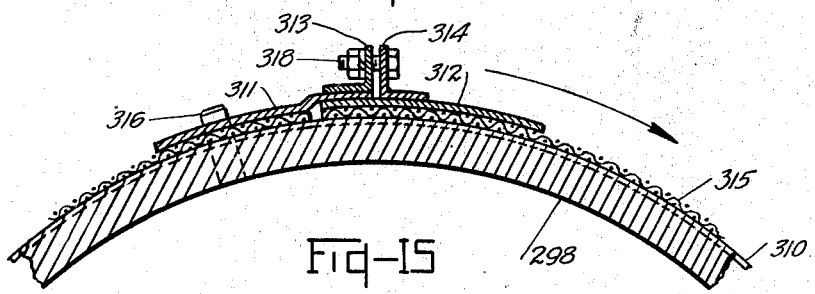
Figure 15 illustrates an enlarged vertical section view of the screen end joining assembly, such view being taken on line 15—15 of Figure 5 looking in the direction of the arrows.

The printing cylinder assembly, which will now be described in detail, is mounted on central shaft 296 (Figure 7). Mounted on one end of shaft 296 is a hand wheel 297 which may be utilized to rotate shaft 296 on which center cylindrical member 298 is keyed or otherwise fastened in conventional manner. After shaft 296 and center cylindrical member 298 have been adjusted to suitable position by means of hand wheel 297, they may be anchored in place by means of a locking screw 299 or the like. Mounted at the ends of the printing cylinder assembly are ring gears 300 which are concentric with shaft 296 and in mesh with ring gears 264 directly below same, the latter being mounted on the ends of the impression cylinder assembly. Ring gears 300 are mounted on hub members 301 and 302 and joined in fixed location thereon by means of cap screws 303 or the equivalent. Hub member 301 is preferably keyed to the hub of pinion 304 which is freely rotatable on shaft 296. Hub member 302 on the other hand is mounted for free rotation on squeegee adjusting member 305 which in turn is rotatably mounted on shaft 296. The inner edges of hub members 301 and 302 at the points of contact with center cylindrical member 298 are preferably formed with tongue and groove labyrinth connections 306 which function to substantially prevent leakage of printing medium into the space within hub members 301 and 302. The outer periphery of hub members 301 and 302 are provided with grooves 307 and 308 (Figure 7) adapted to receive side members 309 and 310 of the screen frame assembly. Side members 309 and 310 (Figures 15 and 16) are joined at the ends thereof by means of substantially parallel end members 311 and 312, and these respectively carry lock-up angle members 313 and 314 rigidly attached thereto. Mounted on the outer face of side members 309 and 310 and the under face of end members 311 and 312 is a suitable metal screen preferably in the form of a fine mesh phosphor bronze screen, although a screen of silk or other fabric may be used if so desired. Where a metallic screen is used, it may be line welded, sweated, or otherwise attached to the spring steel side members 309 and 310 as well as end members 311 and 312. If a silk or fabric screen of various types is used, same may be cemented to the frame in any approved manner. Side members 309 and 310 in preferred construction are arched as shown in Figure 16 to prevent the possibility of wrinkles forming in the screen 315 which should be firmly and smoothly stretched between the respective side and end members comprising the frame assembly. Side members 309 and 310 are preferably made of spring steel to facilitate wrapping of same around the printing cylinder assembly and locking thereto as shown in Figures 3 and 15. Hub members 301 and 302 are provided with driving pins 316 (Figures 5 and 15) which pass through suitable openings 317 (Figure 16) in the junction of side members 309 and 310 with end member 311. The use of driving pins in this manner aids in holding the screen assembly during mounting on the printing cylinder, provides positive location of the screen thereon, and transmits the driving strain to the steel side members 309 and 310 of the screen frame assembly. This procedure takes all driving strain off of the screen 315 and transmits it to the side and end members of the assembly. The locking of the screen assembly on the cylinder may be accomplished in conventional manner, for instance by means of lock-up screws 318 (Figures 5 and 15) which pass through suitably aligned openings in lock-up angle members 313 and 314.

Figure 9:
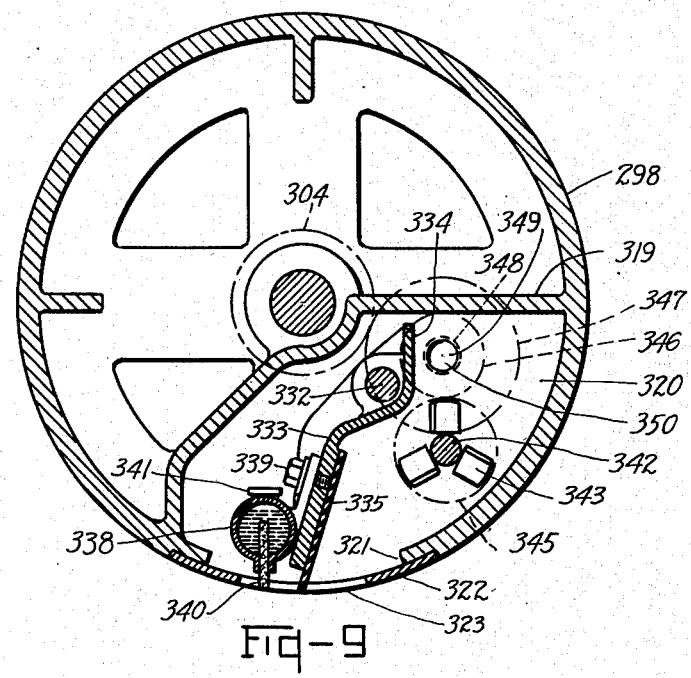
Figure 9 illustrates an enlarged vertical section through the rotary cylinder with screen removed, as taken at line 9—9 of Figures 5 and 7, looking in the direction of the arrows.

The center cylindrical member 298 (Figure 9) is provided with a partition 319 which forms a compartment 320 for retaining a body of printing medium (not shown). The cylinder at the lower edge of compartment 320 is cut-away at 321 and the opening, if desired, may be provided with a cover plate 322 which may be removably attached to cylinder 298 in any conventional manner. Cover plate 322 in turn is provided with a slot 323 extending substantially the full length of cylinder 298. The assembly of the cylinder 298 and cover plate 322 is preferably machined as a unit to provide a smooth cylindrical surface for same over which screen 315 will freely slide.

Figure 10:
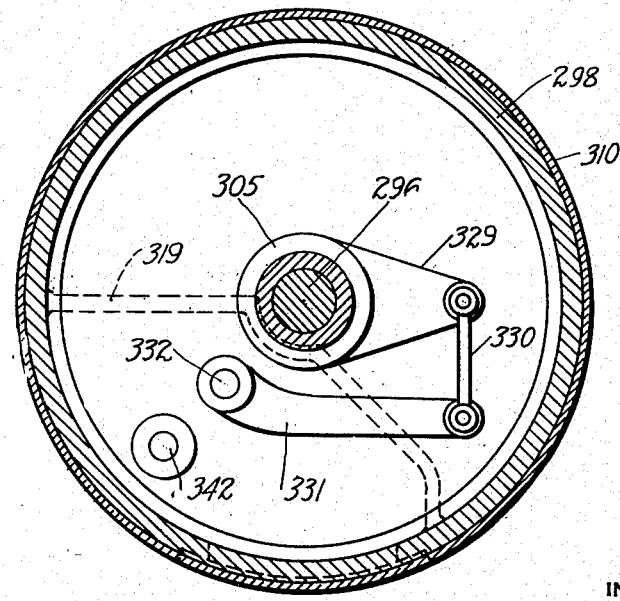
Figure 10 illustrates an enlarged vertical section through one end of the rotary cylinder with the screen removed but with the screen frame in place, as taken at line 10—10 of Figure 7, looking in the direction of the arrows.

Mounted on the end of shaft 296 (Figure 7) is a bracket 324 supporting shaft 325 which has worm 326 keyed or otherwise fastened thereto. Hand wheel 327 also keyed to shaft 325 permits rotation of worm gear 326 which in turn meshes with worm wheel 328 keyed or otherwise fastened to squeegee adjusting lever 305 which, as previously mentioned, is mounted for free rotation on shaft 296. To stabilize the assembly and space the end of center cylindrical member 298 from hub member 302, the squeegee adjusting lever 305 is preferably provided with an enlarged inner end as shown. Arm 329 (Figure 10), which is preferably an integral part of squeegee adjusting lever 305, is pivotally connected by means of connecting link 330 to the end of squeegee shaft lever 331, the opposite end of which is pinned or otherwise fastened to squeegee shaft 332 which in turn is mounted in suitable bearings (not shown) in each end of center cylindrical member 298 (Figure 7). Mounted on squeegee shaft 332 is squeegee carrier frame 333 (Figure 9) which extends substantially from end to end of center cylindrical member 298. The upper edge of the squeegee carrier frame has an extending baffle member 334 which acts as a barrier to normally prevent splashing of printing medium thereover. The lower edge of the squeegee carrier frame has mounted thereon in conventional manner a squeegee member 335 formed from sheet rubber or other suitable material and attached to squeegee carrier frame 333 in any conventional manner. Squeegee 335 extends the full length of center cylindrical member 298 and forms an end seal therewith. The lower edge of squeegee 335 extends into slot 323 of cover plate 322 so as to engage the inner surface of the screen assembly when wrapped around center cylindrical member 298 as shown in Figure 3. It is thus to be seen that the squeegee may be adjusted relative to the inner surface of the screen 315 regardless of the rotation of hubs 301 and 302 which carry this screen, or the movement of center cylindrical member 298 to adjust same under either stationary or running conditions. It is also to be noted that center cylindrical member 298 may be adjusted at any time by means of hand wheel 297 regardless of movement of screen 315 thereover. An indexing dial 336 (Figure 7) mounted on the hub of hand wheel 297 may be utilized with an indexing pointer 337 attached to frame 3 to indicate the setting of center cylindrical member 298 so that the latter may be adjusted to any predetermined position, for example, to compensate for wear of the squeegee, or to return same to proper printing position after cleaning, replacement of parts, or the like.

In order to lubricate the screen so that printing fluid will not stick to either it or the center cylindrical member 298 with which the screen comes in direct contact, a lubricating fluid reservoir 338 (Figure 9) extending substantially from end to end of center cylindrical member 298, and adjustably mounted on squeegee carrier frame 333 by means of cap screws 339, may be utilized. The lower edge of lubricating reservoir 338 is provided with a wick 340 extending from the interior thereof and substantially from end to end of same. The reservoir 338 may be filled with a suitable lubricating fluid such as oil, water, or the like, depending upon the requirements of the particular printing medium being used. Such fluid may be supplied to the reservoir in any manner and a filler cap 341 has been shown and is intended to diagrammatically illustrate any of the many ways by which the filling of this reservoir may be accomplished.

The agitation and distribution of the printing medium is accomplished by means of shaft 342 (Figures 7 and 9) having angularly disposed paddles 343 mounted thereon, or any other suitable mechanism for accomplishing this same end. The ends of shaft 342 are supported in suitable bearings 344 and 344a (Figure 7) in the ends of center cylindrical member 298. Shaft 342 extends through bearing 344 and has mounted in fixed location on the outer end thereof gear 345 (Figures 7 and 9) which meshes with gear 346. Gear 346 is compounded with gear 347 which in turn meshes with gear 304 previously described. This compound gear consisting of gears 346 and 347 is mounted on a hollow idler stud 348 (Figure 9), the opening 349 of which acts as the printing medium filler opening to closed compartment 320, such opening being closed by means of plug 350. To facilitate removal of plug 350 as well as the forcing of printing fluid by means of a gun or the like (not shown) through opening 349 after the removal of plug 350, suitable slots 351 (Figure 7) are provided in hub member 301. The use of closed compartment 320 as a container for the printing medium materially retards evaporation, oxidation, and spoilage losses of the same, effects a considerable saving in printing medium used, and greatly simplifies the cleaning up of all parts coming in contact with the printing medium.

The sheet, now printed, after being forwarded from between propeller roller 259 (Figure 3) and trolley roller 281 to the sheet delivery station, will have its leading edge come into contact with bumper plate 352 mounted on end jogger bar 353 which in turn is endwise adjustably mounted on shaft 354 by means of an adjustable mounting 355 (Figure 5). This mounting member 355 is clamped for adjustable movement endwise on shaft 354 which in turn is pinned or otherwise fastened to link 356 (Figure 3) for stabilization, and the latter in turn is pivotally connected to arm 357 rotatably mounted on shaft 358. Shaft 354 is pivotally mounted at each end on arms 359 which in turn are pinned or otherwise fastened to shaft 360. This assembly of the end jogger mechanism holds bumper plates 352 in upright position throughout the movement thereof. Arm 361 (Figure 1) is keyed or otherwise conventionally fastened to shaft 360, and the free end of this arm is pivotally connected by means of connecting rod 362 to the free upper end of arm 363 which is keyed or otherwise fastened to shaft 364 mounted in a suitable bearing 365 (Figure 5) in frame 3. Also keyed or otherwise fastened on shaft 364 is rocker lever 366, one arm 367 of which is pivotally connected to connecting rod 368, the opposite end of which is provided with a cam fork 369 (Figure 24) straddling shaft 370, in the same manner as fork 399 of Figure 3. This fork 369 also carries cam roller 371 which operates in raceway 372 of cam 373. Shaft 370 has miter gear 374 (Figure 1) mounted thereon and in mesh with miter gear 375 keyed or otherwise fastened on the end of main drive shaft 8 which in turn is supported on suitable bearings 376.

Rocker lever 366 (Figure 5) also carries arm 377 on the free end of which are pivotally connected links 378 and 379. The free end of link 379 is pivotally connected to arm 380 which is keyed or otherwise suitably fastened to shaft 381 supported on bracket 382. The opposite end of shaft 381 is keyed or otherwise suitably fastened to arm 383. Pivotally and adjustably mounted on the end of arm 383 is pusher rod 384. This same pusher rod is also pivotally adjustable and fastened to arm 385, which in turn is pivotally mounted on stud 386 fastened to bracket 382, thus stabilizing and guiding the pusher rod in its movements. Link 378 is connected through a linkage, preferably the same as that just described, to pusher rod 387, and hence detailed description of same is omitted to avoid duplicate description. Mounted on the end of pusher rods 384 and 387 respectively are flanged end members 388 and 389 (Figure 5) on which is mounted side jogger plate 390 (Figures 5 and 22) which in turn carries longitudinal sheet supporting angle 391. Side jogger plate 390 and sheet supporting angle 391 have suitably cut-away portions 392 and 393 (Figure 5) through which stripper plates 394 and 395 respectively are adapted to project when the pusher mechanism is retracted. Stripper plates 394 and 395 respectively are adjustably mounted for endwise movement on supporting brackets 396 and 397, which in turn are mounted in fixed location on frame 3. Shaft 370 (Figure 3) has a second cam 398 (Figures 3 and 5) mounted thereon. This cam, which operates in unison with cam 373 has raceway 481 cut therein which engages suitable cam roller 480 mounted on cam fork 399 and thus moves the latter and connecting rod 400 in the same direction as cam fork 369 and connecting rod 368. The free end of connecting rod 400 (Figure 5) is connected to arm 401 of rocker lever 402 which in turn is mounted on shaft 482 (Figure 3) and connected to a side pusher linkage identical to that just described above. This linkage carries sheet side support member 403 (Figures 5 and 22) with inturned lower flange 404 which acts as a sheet supporting member similar to angle 391 on side jogger plate 390. Mounted on the end of adjustable stripper plates 405 and 406 (Figure 5) is a stationary stop plate 407 (Figure 22) the upper edge 408 of which is flared outward to facilitate guiding the sheet when released from lower flange 404 upon retraction of the supporter on which it is mounted. Stripper plates 405 and 406 (Figure 5) are respectively mounted on brackets 409 and 410 which are preferably identical with brackets 396 and 397, and similarly mounted in fixed position on main frame 3. Mounted on fixed shaft 411 (Figure 3) are adjustable clamping members 412 on which are adjustably mounted supporting rods 413 carrying flanged end members 414 which in turn have mounted thereon sheet end stop plates 415 which have a backwardly flared upper edge 416. Sheet feed table 96 is supported at the sheet receiving end on shaft 102 (Figures 4 and 23), and at the other end on shaft 411 (Figure 3). This construction, involving metal to metal joining of parts, electrically grounds the sheet feed table to main frame 3 of the assembly.

In operation, the sheet which has been delivered from the printing station for piling on platform 44 is carried forward by its delivery momentum until the leading edge of the sheet comes up against end bumper plates 352 (Figure 5) when same are in retracted position, the side edges of the sheet being supported on angle 391 and flange 404. The rotation of cams 373 and 398 then cause side jogger plate 390 (Figure 22) and sheet side support member 403 to be retracted in an outward direction to drop the sheet at the same time as bumper plates 352 (Figure 5) move in a forward direction to shift the sheet up against sheet end stop plates 415. Sheet side support member 403 and side jogger plate 390 then immediately move inward whereupon the lower edge of sheet jogger plate 390 (Figure 22) jogs the now dropped and end positioned sheet sidewise up against stationary stop plate 407, thus leaving the delivered sheet in an orderly piled position on platform 44. This series of motions has not only jogged the sheet into position, but has placed the mechanism in position to receive the next sheet delivered for piling.

In order to reduce sagging of the sheet in the course of its passage to position over the pile of delivered stock on platform 44 after leaving sheet feed table 96, the assembly may be provided with a suitably perforated pipe 417 (Figure 3) adapted to deliver, from a suitable source (not shown), compressed air for supporting the sheet. Objectionable sagging of wide or light-weight sheets can be readily avoided in this manner.

Figure 13:
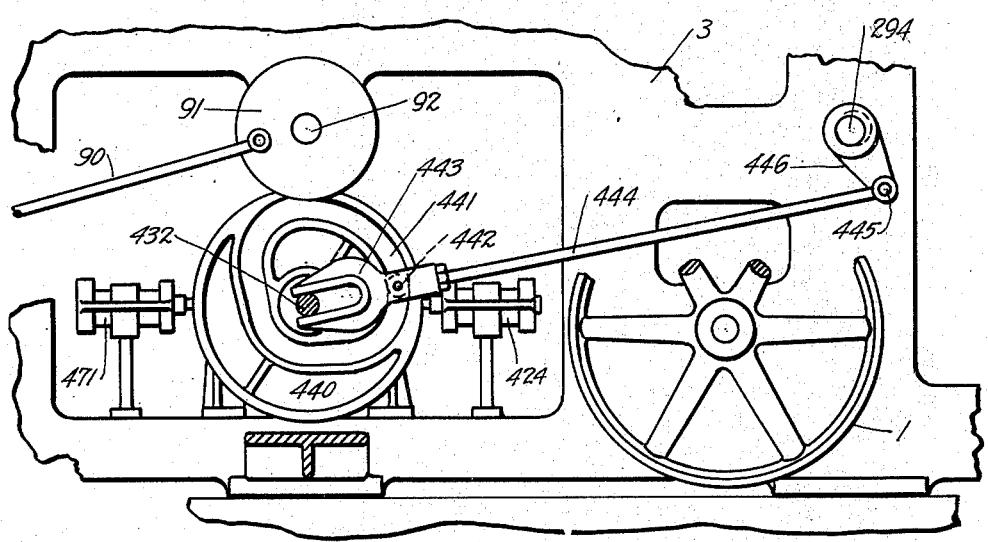
Figure 13 illustrates an enlarged partially sectioned side view of the cam mechanism which raises and lowers the impression cylinder as required, such view being taken along line 13—13 of Figures 6, 8, and 11, looking in the direction of the arrows.

In order to prevent the printing medium from being transferred through screen 315 (Figure 7) onto the face of impression cylinder blanket 290 of impression cylinder 286, the latter cylinder is mounted on shaft 293 which has eccentric ends 294 as previously described. It is thus to be seen that if shaft 293 is rotated a part turn, for instance 45° to 90° more or less, with the shaft initially in the up position shown, the rotation noted will drop impression cylinder 286 sufficiently to prevent direct contact between impression cylinder blanket 290 and screen 315. This presents, when sheets are not being being fed, the advantage of avoiding the depositing of printing medium on impression cylinder blanket 290 from whence in turn it would be transferred to the under face of the next sheet delivered to the printing station. The mechanism for accomplishing the automatic lowering and raising of the impression cylinder, in step with the respective nondelivery or delivery of the sheets from platform 29 to the assembly, will now be described. Suction head 74 (Figure 23) has an insulating block 418 mounted thereon by means of suitable screws 419. Mounted on the top of insulating block 418 by means of cap screws 420 is a contactor spring 421. Contactor spring 421 is preferably provided with an up-turned free end 422, the under face of which is adapted to contact the upper face of metallic sheet feed table 96 at any time the mechanism fails to feed a sheet thereon. Spring contactor 421 is connected by means of a suitable electrical connecting wire 423 to solenoid 424 (Figures 11 and 12). Lead wire 425 connected to other end of solenoid 424 is connected in suitable manner to complete an electrical circuit and energize solenoid 424 the moment contactor spring 421 comes into direct electrical contact with sheet feed table 96. The solenoid 424 is mounted in conventional manner on frame 3, for example, by means of supporting post 426 or the like. The movable core 427 of solenoid 424 is pivotally joined by means of pivot pin 429 to bell-crank shaped dog 428 for actuation of the latter. Dog 428 in turn is mounted on bracket 430 by means of fulcrum pin 431. Movable core 427 and bell-crank shaped dog 428 are shown in Figures 11 and 12 in the position which they take when solenoid 424 is energized due to contactor spring 421 contacting sheet feed table 96. When contactor spring 421 is not in contact with sheet feed table 96, movable core 427 and dog 428 are in the position shown in dotted lines in Figure 11 for a purpose to be hereinafter described. Shaft 432 (Figures 8, 11, and 12) is mounted in suitable bearings on bearing brackets 433 and 434. Keyed to shaft 432 (Figure 8) is gear 435 which meshes with gear 436 on shaft 92 which is driven by means of main shaft 8 as hereinbefore described. Thrust collar 437 may be used in conventional manner, for instance, in combination with gear 435, to prevent endwise movement of shaft 432. Keyed to shaft 432 is a driving hub 438, and mounted on said shaft adjacent said hub by means of a suitable bearing, is driving disc 439 and cam 440. The driving disc 439 and cam 440 are joined together in conventional manner for movement in unison as well as free rotation about and concentric with shaft 432. Cam 440 (Figure 11) is provided with raceway 441 in which cam roller 442 mounted on cam fork 443 is adapted to freely move. Cam fork 443 is adjustably mounted on connecting rod 444 (Figures 7 and 13) which is pivotally connected to swivel stud 445 mounted on arm 446 which in turn is keyed or otherwise joined to one of the eccentric ends 294 of impression cylinder shaft 293. Mounted on driving disc 439 (Figure 12) by means of fulcrum stud 447 is driving pawl 448. Driving pawl 448 has a latching point 449 at one end and a throw-out cam arm 450 at the other end, with a stop shoulder 451 at the pivot end thereof. Driving hub 438 is provided with a cam face 452 terminating in a driving shoulder 453. Spring 454 attached to suitable stud 455 in driving disc 439 exerts pressure on pawl 448 to normally force latching point 449 thereof into engagement with driving shoulder 453 when said pawl is released for rotation on fulcrum stud 447. Driving disc 439 is also provided with cam faces 456 terminating in holding shoulders 457. Back motion stop dog 458 is keyed or otherwise fastened to shaft 459 mounted on bracket 430. The opposite end of shaft 459 has arm 460 keyed or otherwise suitably fastened thereto. The upper end of arm 460 is connected to bracket 430 in conventional manner by means of tension spring 461 which normally holds back motion stop dog 458 in position to engage holding shoulders 457 of driving disc 439, thus limiting the extent of backward rotation of driving disc 439 when the driving mechanism is disengaged.

Figure 14:
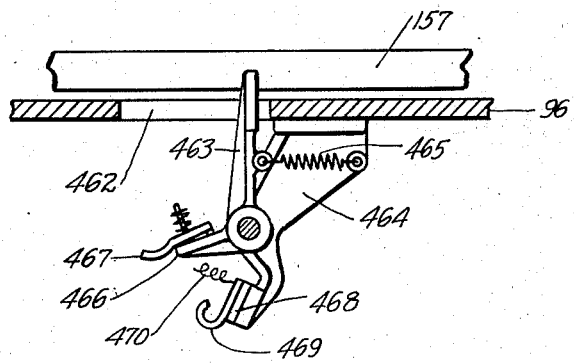
Figure 14 illustrates an enlarged vertical section side view of the sheet trip assembly, such view being taken on line 14—14 of Figures 6 and 8, looking in the direction of the arrows.

Projecting through suitable opening 462 (Figures 6, 8, and 14) of sheet feed table 96 is a trip arm 463 pivotally mounted on bracket 464 and held normally in upright position by means of mild tension spring 465. The upper end of trip arm 463 extends above the upper edge of sheet feed table 96 and slightly above the lower edge of sheet guide bars 157 for positive operating contact with sheets passing over the top of sheet feed table 96. The lower end of trip arm 463 has an extending arm 466 carrying spring cushioned grounded contactor finger 467. Mounted on the lower end of bracket 464 and insulated therefrom by means of insulating block 468 is live electric contactor finger 469. The normal spacing of live contactor 469 from grounded contactor finger 467 is such that the two will be brought into electrical contact by rotation of arm 463 due to the passing of a sheet thereover.

Live contactor 469 (Figure 14) is connected by means of a suitable electrical connector 470 to solenoid 471 (Figures 11 and 12) suitably carried, for example, on supporting post 472 mounted on main frame 3. Movable core 473 is pivotally connected in suitable manner to bellcrank shaped dog 474 by means of pivot pin 475. Dog 474 in turn is pivotally mounted on bracket 476 by means of fulcrum pin 477. Movable core 473 and dog 474 are shown in Figures 11 and 12 in the retracted position which they assume when trip arm 463 (Figure 14) is in upright position with contacts 467 and 469 open, a thing which is true whenever there is no sheet passing over trip arm 463.

When the assembly is operating under normal conditions, with sheets continuously passing therethrough, contactor spring 421 (Figure 23) will be prevented from contacting sheet feed table 96 by means of the sheets passing thereunder. Under these conditions, movable core 427 (Figures 11 and 12), bell-crank shaped dog 428, and driving pawl 448 will be in the position shown in dotted lines. The moment, however, that contactor spring 421 (Figure 23) contacts sheet feed table 96 due to the lack of a sheet being fed, the solenoid 424 (Figures 11 and 12) will be immediately energized to throw engaging point 478 of dog 428 sidewise from behind stop shoulder 451 of driving pawl 448, thus allowing the latter to assume the solid line position shown, so that driving shoulder 453 of driving hub 438 will engage latching point 449 thereof, thus connecting driving hub 438 to driving disc 439 for rotation in unison therewith. At the same time the last sheet will have passed over trip arm 463 (Figure 14) thus opening contacts 467 and 469 whereupon solenoid 471 (Figures 11 and 12) will be deenergized and dog 474 will assume the solid line position ready to engage throw-out cam arm 450 of pawl 448 when same reaches point 479 of dog 474. This engagement will force latching point 449 of pawl 448 out of engagement with driving shoulder 453 of driving hub 438 and will allow driving disc 439 to remain stationary at the point of disengagement. This rotation of driving disc 439 through an angle of 180° operates through cam 440, raceway 441, cam roller 442, cam yoke 443, connecting rod 444, and arm 446 (Figure 13), connected to eccentric end 294 (Figure 7) of shaft 293 to throw impression cylinder 286 into lowered position, thus preventing screen 315 from contacting impression cylinder blanket 290 which would deposit printing medium thereon in absence of a sheet therebetween. Then as soon as a new supply of sheets start passing through the assembly, solenoid 424 will be deenergized to throw end 478 of dog 428 into the dotted position (Figure 11) to engage throw-out cam arm 450 of pawl 448 upon its next appearance at this station and move it to the dotted position (Figure 12). This next sheet moving through the apparatus will also move trip arm 463 (Figure 14) so as to cause contactors 467 and 469 to come into contact with each other and energize solenoid 471 through a suitable electric circuit including connectors 470 and 483 so as to throw end 479 of dog 474 sidewise to dotted position (Figure 11) from behind stop shoulder 451 of pawl 448 thus allowing latching point 449 to drop under influence of spring 454 so as to engage driving shoulder 453 of driving hub 438 on its next rotation past that point. Upon engagement, pawl 448 will then be carried to the position shown in dotted lines (Figure 12) and in contact with end 478 of dog 428 as shown in dotted lines (Figure 11), thus, through the agency of the connecting linkage, lifting impression cylinder 286 to its uppermost position once more, and in time to contact the sheet and press it against the printing cylinder when it reaches the printing station.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In the method of printing sheets with a printing mechanism having an impression cylinder and a printing cylinder in printing contact therewith, said printing cylinder having a cylindrical supporting member and a screen mounted thereon, the steps which comprise passing sheets to be printed, one at a time, through the printing station, and sliding said screen around said cylindrical supporting member of said printing cylinder while forcing a printing medium through said screen in prescribed pattern for direct deposit on each of said sheets passing through said printing station.

2. In the method of printing sheets with a printing mechanism having an impression cylinder and a printing cylinder in printing contact therewith, said printing cylinder having a cylindrical supporting member and a screen mounted thereon, the steps which comprise automatically delivering sheets to the printing station, passing said sheets, one at a time, through said printing station, sliding said screen around said cylindrical supporting member of said printing cylinder while forcing a printing medium through said screen in prescribed pattern for direct deposit on each of said sheets passing through said printing station, and automatically removing each sheet from said printing station at the end of the printing step.

3. In the method of printing sheets with a printing mechanism having an impression cylinder and a printing cylinder in printing contact therewith, said printing cylinder having a cylindrical supporting member and a screen mounted thereon, the steps which comprise automatically delivering sheets to be printed, one at a time, to a prepositioning station, prepositioning said sheets at said prepositioning station to a side and forward position, automatically delivering said prepositioned sheets, one at a time, to the printing station, passing said sheets one after another through said printing station, sliding said screen around said cylindrical supporting member of said printing cylinder while forcing a printing medium through said screen in prescribed pattern for direct deposit on each of said sheets passing through said printing station, and automatically removing each sheet from said printing station at the end of the printing step.

4. In the method of printing sheets with a printing mechanism having an impression cylinder and a printing cylinder in printing contact therewith, said printing cylinder having a cylindrical supporting member and a screen mounted thereon, the steps which comprise automatically delivering sheets to be printed, one at a time, to a prepositioning station, prepositioning said sheets at said prepositioning station to a side and forward position, automatically delivering said prepositioned sheets, one at a time, to the printing station, passing said sheets one after another through said printing station, sliding said screen around said cylindrical supporting member of said printing cylinder while forcing a printing medium therethrough in prescribed pattern for direct deposit on each of said sheets passing through said printing station, applying a medium to the inner face of said screen to retard adherence of printing medium thereto, and automatically removing each sheet from said printing station at the end of the printing step.

5. In the method of printing sheets with a rotary screen which slides over a stationary cylindrical member containing a squeegee in contact with the inner face of said rotating screen for spreading a printing medium and forcing a portion of same therethrough, the step which consists in applying to the inner face of said screen a medium which makes said screen resist adherence of said printing medium thereto.

6. In an apparatus for printing, the combination of a frame, a sheet feed table, means for delivering a sheet to be printed onto said table, means for forwarding said sheet, means for stopping said sheet, means for side jogging said stopped sheet to uniform position, a rotary screen printing cylinder, said printing cylinder comprising a cylindrical supporting member, a suitable screen assembly, and means at the ends of said supporting member for sliding said screen around the latter, an impression cylinder, means for rotatably sliding said screen at a surface speed substantially the same as the surface speed of said impression cylinder under printing conditions, means for forwarding said side jogged sheet between said printing cylinder and impression cylinder, and means for delivering said sheet from between said printing cylinder and impression cylinder.

7. In an apparatus for printing, the combination of a frame, a sheet feed table, means for delivering a sheet to be printed onto said table, means for forwarding said sheet, means for stopping said sheet, means for momentarily gripping said sheet adjacent the leading edge thereof to quiet same the moment it is stopped, means for side jogging said stopped sheet to uniform position, a rotary screen printing cylinder, said printing cylinder comprising a cylindrical supporting member, a suitable screen assembly, and means at the ends of said supporting member for sliding said screen around the latter, a suitable impression cylinder, means for rotatably sliding said screen at a surface speed substantially the same as the surface speed of said impression cylinder under printing conditions, means for forwarding said side jogged sheet between said printing cylinder and impression cylinder, and means for forwarding said sheet from between said printing cylinder and impression cylinder to a point of delivery.

8. In an apparatus for printing, which has means for delivering sheets to be printed, one at a time, to the printing station, and also means for removing said sheets from said printing station, the combination which comprises an impression cylinder, and a printing cylinder mounted in printing contact therewith, said printing cylinder having a center cylindrical member, means for anchoring said center cylindrical member in fixed location, a screen assembly, and means for sliding at least a portion of the screen of said screen assembly around said center cylindrical member.

9. In an apparatus for printing, which has means for delivering sheets to be printed, one at a time, to the printing station, and also means for removing said sheets from said printing station, the combination which comprises a suitable impression cylinder, and a printing cylinder mounted in printing contact therewith, said printing cylinder having a center cylindrical member, means for anchoring said center cylindrical member in fixed location, means for rotary adjustment of said center cylindrical member, a screen assembly, and means for rotating said screen assembly with at least a portion of the screen thereof sliding around said center cylindrical member.

10. In an apparatus for printing, which has means for delivering sheets to be printed, one at a time, to the printing station, and also means for removing said sheets from said printing station, the combination which comprises a suitable impression cylinder, and a printing cylinder mounted in printing contact therewith, said printing cylinder having a center cylindrical member with a longitudinal slot through the periphery thereof, means for anchoring said center cylindrical member in fixed position, a screen assembly, means for rotating said screen assembly with at least a portion of the screen thereof sliding around said center cylindrical member, and a squeegee within said center cylindrical member, said squeegee extending from end to end of the interior of said cylindrical member and projecting through said longitudinal slot thereof into contact with the inner face of said screen member throughout the length of said slot.

11. In an apparatus for printing, which has means for delivering sheets to be printed, one at a time, to the printing station, and also means for removing said sheets from said printing station, the combination which comprises a suitable impression cylinder, a printing cylinder mounted in printing contact therewith, means for connecting said printing cylinder and impression cylinder for substantially identical peripheral speed under operating conditions, and means for rotary adjustment of said cylinders relative to each other, said printing cylinder having a center cylindrical member, means for anchoring said center cylindrical member in fixed location, a screen member mounted for rotary sliding movement over said center cylindrical member, and means for rotating at least a portion of said screen member over said center cylindrical member.

12. In an apparatus for printing, which has means for delivering sheets to be printed, one at a time, to the printing station, and also means for removing said sheets from said printing station, the combination which comprises a suitable impression cylinder, a printing cylinder mounted in printing contact therewith, means for connecting said printing cylinder and impression cylinder for substantially identical peripheral speed under operating conditions, and means for rotary adjustment of said cylinders relative to each other, said printing cylinder having a center cylindrical member with a longitudinal slot through the periphery thereof, means for anchoring said center cylindrical member in fixed location, a screen mounted for rotary sliding movement over said center cylindrical member, means for rotating said screen member, and a squeegee within said center cylindrical member, said squeegee extending from end to end of the interior of said cylindrical member and projecting through said longitudinal slot thereof into contact with the inner face of said screen member throughout the length of said slot.

13. In an apparatus for printing which has means for delivering sheets to be printed, one at a time, to the printing station, and also means for removing said sheets from said printing station, the combination which comprises a suitable impression cylinder, and a printing cylinder mounted in printing contact therewith, said printing cylinder having a center cylindrical member closed at its ends, the lower portion of said center cylindrical member being adapted to contain a suitable printing medium, said center cylindrical member having a longitudinal slot through the periphery thereof, said slot extending full length of the interior of said center cylindrical member in the area thereof adapted to contain said printing medium, a squeegee within said center cylindrical member, said squeegee extending from end to end of the interior of said cylindrical member and projecting through said longitudinal slot thereof, means for anchoring said center cylindrical member in fixed location, a screen member mounted for rotary sliding movement over said center cylindrical member, and means for rotating said screen member with said squeegee in contact with the inner face thereof.

14. In an apparatus for printing which has means for delivering sheets to be printed, one at a time, to the printing station, and also means for removing said sheets from said printing station, the combination which comprises a suitable impression cylinder, and a printing cylinder mounted in printing contact therewith, said printing cylinder having a center cylindrical member closed at its ends and provided with a partition forming a printing medium chamber lengthwise of and in the normally lower portion of said center cylindrical member, said center cylindrical member having a longitudinal slot through the periphery thereof, said slot opening full length into said printing medium compartment, a squeegee within said center cylindrical member, said squeegee extending from end to end of the printing medium compartment of said cylindrical member and projecting through said longitudinal slot thereof, means for anchoring said center cylindrical member in fixed location, a screen member mounted for rotary sliding movement over said center cylindrical member, means for rotating said screen member with said squeegee in contact with the inner face thereof, and means for lubricating the inner face of said screen.

15. In an apparatus for printing which has means for delivering sheets to be printed, one at a time, to the printing station, and also means for removing said sheets from said printing station, the combination which comprises a suitable impression cylinder, and a printing cylinder mounted in printing contact therewith, said printing cylinder being mounted on a central shaft, a central cylindrical member fastened to said shaft for movement therewith, a hub member at each end of said center cylindrical member, said hub members being adapted to be rotated relative to said shaft, a gear on each of said hub members, a gear on each end of said impression cylinder, said impression cylinder gears meshing with said printing cylinder gears for driving the latter, a screen assembly having a frame removably joined to said hub members of the printing cylinder for rotation therewith and sliding over said center cylindrical member, means for anchoring said center cylindrical member in fixed position, said center cylindrical member being closed at its ends and provided with a slot extending full length of the interior of said center cylindrical member, and a squeegee within said center cylindrical member, said squeegee extending from end to end of the interior of said center cylindrical member and projecting through said longitudinal slot thereof and into contact with the inner face of said screen, said slot being on the lower edge of said cylinder and substantially at the line of contact of said printing and impression cylinders under normal operating conditions.

16. In an apparatus for printing which has means for delivering sheets to be printed, one at a time, to the printing station, and also means for removing said sheets from said printing station, the combination which comprises a suitable impression cylinder and a printing cylinder mounted in printing contact therewith, said printing cylinder being mounted on a central shaft, a central cylindrical member fastened to said shaft for movement therewith, a hub member at each end of said center cylindrical member, said hub members being adapted to be rotated relative to said shaft, a gear on each of said hub members, a gear on each end of said impression cylinder, said impression cylinder gears meshing with said printing cylinder gears for driving the latter, means for peripherally adjusting the hub members of said printing cylinder relative to said impression cylinder, a screen assembly having a frame removably joined to said hub members of the printing cylinder for rotation therewith and sliding over said center cylindrical member, means for rotatably adjusting said center cylindrical member, means for anchoring said center cylindrical member in fixed position, said center cylindrical member being closed at its ends and provided with a slot extending full length of the interior of said center cylindrical member, and a squeegee within said center cylindrical member, said squeegee extending from end to end of the interior of said center cylindrical member and projecting through said longitudinal slot thereof and into contact with the inner face of said screen, said slot being on the lower edge of said cylinder and substantially at the line of contact of said printing and impression cylinders under normal operating conditions.

17. In an apparatus for printing which has means for delivering sheets to be printed, one at a time, to the printing station, and also means for removing said sheets from said printing station, the combination which comprises a suitable impression cylinder and a printing cylinder mounted in printing contact therewith, said printing cylinder being mounted on a central shaft, a central cylindrical member fastened to said shaft for movement therewith, a hub member at each end of said center cylindrical member, said hub members being adapted to be rotated relative to said shaft, a gear on each of said hub members, a gear on each end of said impression cylinder, said impression cylinder gears meshing with said printing cylinder gears for driving the latter, means for peripherally adjusting the hub members of said printing cylinder relative to said impression cylinder, a screen assembly having a frame removably joined to said hub members of the printing cylinder for rotation therewith and sliding over said center cylindrical member, means for rotatably adjusting said center cylindrical member, means for anchoring said center cylindrical member in fixed position, said center cylindrical member being closed at its ends and provided with a slot extending full length of the interior of said center cylindrical member, a squeegee within said center cylindrical member, said squeegee extending from end to end of the interior of said center cylindrical member and projecting through said longitudinal slot thereof and into contact with the inner face of said screen, said slot being on the lower edge of said cylinder and substantially at the line of contact of said printing and impression cylinders under normal operating conditions, and means for adjusting said squeegee.

18. In an apparatus for printing which has means for delivering sheets to be printed, one at a time, to the printing station, and also means for removing said sheets from said printing station, the combination which comprises a suitable impression cylinder, and a printing cylinder mounted in printing contact therewith, said printing cylinder being mounted on a central shaft, a central cylindrical member fastened to said shaft for movement therewith, a hub member at each end of said center cylindrical member, said hub members being adapted to be rotated relative to said shaft, a gear on each of said hub members, a gear on each end of said impression cylinder, said impression cylinder gears meshing with said printing cylinder gears for driving the latter, means for peripherally adjusting said printing cylinder hub members relative to said impression cylinder, a screen assembly having a frame removably joined to said hub members of the printing cylinder for rotation therewith over said center cylindrical member, means for rotatably adjusting said center cylindrical member, means for anchoring said center cylindrical member in fixed position, said center cylindrical member being closed at its ends and provided with a partition forming a printing medium chamber lengthwise of and in the normally lower portion of said center cylindrical member, means within said chamber for agitating printing medium therein under printing operation, said center cylindrical member having a longitudinal slot extending full length of the interior of said center cylindrical member, a squeegee within said center cylindrical member, said squeegee extending from end to end of the interior of said printing medium chamber of said center cylindrical member and projecting through said longitudinal slot thereof and into contact with the inner face of said screen, said slot being on the lower edge of said cylinder under normal operation conditions, and means for adjusting said squeegee.

19. In an apparatus for printing, which has means for delivering sheets to be printed, one at a time, to the printing station, and also means for removing said sheets from said printing station, the combination which comprises a suitable impression cylinder, a printing cylinder mounted in printing contact therewith, means for automatically throwing said printing cylinder and impression cylinder out of printing contact upon failure of delivery of a sheet to be printed, and means to automatically return said printing cylinder and impression cylinder back into printing contact as soon as sheets to be printed are again delivered for printing, said printing cylinder having a center cylindrical member, means for anchoring said center cylindrical member in fixed location, a screen member mounted for rotary sliding movement over said center cylindrical member, and means for rotating said screen member.

20. In an apparatus for printing, which has means for delivering sheets to be printed, one at a time, to the printing station, and also means for removing said sheets from said printing station, the combination which comprises a suitable impression cylinder, a printing cylinder mounted in printing contact therewith, an electrically operated means for lowering said impression cylinder out of printing contact with said printing cylinder upon failure of delivery of a sheet to be printed, an electrically operated means for raising said impression cylinder back into printing contact as soon as sheets to be printed are again delivered for printing, said printing cylinder having a center cylindrical member, means for anchoring said center cylindrical member in fixed location, a screen member mounted for rotary sliding movement over said center cylindrical member, and means for rotating said screen member while said center cylindrical member is held in fixed location.

21. In an apparatus for printing, which has means for delivering sheets to be printed, one at a time, to the printing station, and also means for removing said sheets from said printing station, which comprises a rotary screen printing cylinder at said printing station, said printing cylinder having a center cylindrical member adapted to be anchored in fixed location, a printing screen adapted to be wrapped around said center cylindrical member and rotatively moved thereover, said screen being mounted on a frame having parallel end members and normally arched flexible side members.

22. In an apparatus for printing, which has means for delivering sheets to be printed, one at a time, to the printing station, and also means for removing said sheets from said printing station, the combination which comprises a suitable impression cylinder, a printing cylinder mounted in printing contact therewith, said printing cylinder being mounted on a central shaft, a center cylindrical member, said center cylindrical member being joined in fixed position on said shaft, a hub member at each end of said center cylindrical member, said hub members being adapted to be rotated relative to said shaft, a screen assembly having a screen and a frame, said frame being removably joined to said hub members of the printing cylinder for rotation therewith and sliding of said screen over said center cylindrical member, the frame of said screen assembly having parallel end members and normally arched flexible side members, said screen being suitably joined to said side and end members, means for joining said impression cylinder to said hub members so that the peripheral speed of said impression cylinder and said screen on said printing cylinder will be substantially identical, and means for driving said impression cylinder.

23. An apparatus for printing, which comprises means for delivering sheets to be printed, one at a time, to a printing station, means for removing said sheets from said printing station, a suitable impression cylinder, a rotary screen printing cylinder mounted in printing contact therewith, said rotary screen printing cylinder having a center cylindrical member, means for anchoring said center cylindrical member, and a screen, said screen sliding around said center cylindrical member during printing operation, means for receiving said sheets removed from said printing station, and means for automatically jogging said printed sheets after delivery to said printed sheet receiving station, so as to form an orderly stacked pile of printed sheets.

24. A printing apparatus which has as a part thereof a cylinder with a longitudinal slot in the face thereof, said slot communicating with a normally closed printing medium receiving compartment, a screen assembly wrapped around said cylinder, and means for sliding said screen assembly around said cylinder.

25. A printing apparatus which has as a part thereof a cylinder with a longitudinal slot in the face thereof, said slot communicating with a normally closed printing medium receiving compartment, a screen assembly wrapped around said cylinder, means for sliding said screen assembly around said cylinder, and a squeegee within said cylinder, said squeegee extending into said slot and into contact with the inner face of the screen of said screen assembly.

26. A printing apparatus which has as a part thereof a cylinder with a longitudinal slot in the face thereof, said slot communicating with a normally closed printing medium receiving compartment, a screen assembly wrapped around said cylinder, means for sliding said screen assembly around said cylinder, a squeegee within said cylinder, said squeegee extending into said slot and into contact with the inner face of the screen of said screen assembly, and means for rotatably adjusting said cylinder about its axis to meet printing requirements.

27. A printing apparatus which has as a part thereof a closed end cylinder with a longitudinal slot in the face thereof, a screen assembly wrapped around said cylinder, means for sliding said screen assembly around said cylinder, a squeegee within said cylinder, said squeegee extending into said slot and into contact with the inner face of the screen of said screen assembly, means for adjusting said squeegee into and out of contact with said screen, and means for rotatably adjusting said cylinder about its axis to meet printing requirements without affecting the adjustment of said squeegee.

28. A printing apparatus which has as a part thereof a closed end cylinder with a longitudinal slot in the face thereof, a screen assembly wrapped around said cylinder, means for sliding said screen assembly around said cylinder, a squeegee within said cylinder, said squeegee extending into said slot and into contact with the inner face of the screen of said screen assembly, means for adjusting said squeegee into and out of contact with said screen, means for rotatably adjusting said cylinder about its axis to meet printing requirements without affecting the adjustment of said squeegee, means for agitating a printing medium in said cylinder, and means for driving said agitator.

HOWARD H. METCALF.